United States Patent
Datta et al.

(10) Patent No.: US 11,949,139 B2
(45) Date of Patent: Apr. 2, 2024

(54) ELECTROCHEMICAL CELL AND METHOD FOR CARBON CAPTURE WITH ENERGY STORAGE

(71) Applicant: Volta Energy, Inc., Worcester, MA (US)

(72) Inventors: Ravindra Datta, Worcester, MA (US); Srivatsava V. Puranam, Montreal-Ouest (CA); Karan Datta, Harrow (GB)

(73) Assignee: Volta Energy, Inc., Worcester, MA (US)

( * ) Notice: Subject to any disclaimer, the term of this patent is extended or adjusted under 35 U.S.C. 154(b) by 0 days.

(21) Appl. No.: 17/535,290

(22) Filed: Nov. 24, 2021

(65) Prior Publication Data

US 2022/0181668 A1    Jun. 9, 2022

Related U.S. Application Data

(60) Provisional application No. 63/119,058, filed on Nov. 30, 2020.

(51) Int. Cl.
*H01M 8/18* (2006.01)

(52) U.S. Cl.
CPC ........ *H01M 8/188* (2013.01); *H01M 2250/10* (2013.01)

(58) Field of Classification Search
CPC .................................................. H01M 2250/10
See application file for complete search history.

(56) References Cited

U.S. PATENT DOCUMENTS

| 2009/0127127 | A1* | 5/2009 | Jones | B01D 53/75 205/464 |
| 2012/0203392 | A1* | 8/2012 | Pandy | H01M 8/188 700/295 |
| 2017/0137951 | A1* | 5/2017 | Xie | H01M 4/926 |

FOREIGN PATENT DOCUMENTS

| GB | 1500852 | * | 2/1978 |
| GB | 1500852 A | | 2/1978 |
| WO | 2015026393 A1 | | 2/2015 |
| WO | WO 2015/026393 | * | 2/2015 |
| WO | 2019160413 A1 | | 8/2019 |
| WO | WO 2019/160413 | * | 8/2019 |

OTHER PUBLICATIONS

International Search Report, PCT/US2021/060825, dated Feb. 24, 2022, pp. 1-3.

* cited by examiner

*Primary Examiner* — Alexander Usyatinsky
(74) *Attorney, Agent, or Firm* — Armis IP Law, LLC

(57) ABSTRACT

Described are flow electrochemical cells and systems using flow electrochemical cells that carry simultaneous $CO_2$ capture and electrical energy storage. The flow electrochemical cells comprise a negative electrode configured to be in fluid communication with alkaline negative electrolyte, a positive electrode configured to be in fluid communication with acidic positive electrolyte, a first ion-exchange membrane in contact with the negative electrode, a second ion-exchange membrane in contact with the positive electrode, and an inert intermediate neutralyte layer between the first ion-exchange membrane and the second ion-exchange membrane.

18 Claims, 17 Drawing Sheets

ELECTROCHEMICAL CELL AND METHOD FOR CARBON CAPTURE WITH ENERGY STORAGE

RELATED APPLICATIONS

This patent application claims the benefit under 35 U.S.C. § 119(e) of U.S. Provisional Patent App. No. 63/119,058, filed Nov. 30, 2020, entitled "ELECTROCHEMICAL CELL AND METHOD FOR CARBON CAPTURE WITH ENERGY STORAGE," incorporated herein by reference in entirety.

FIELD OF THE INVENTION

This disclosure relates to systems and methods of simultaneous carbon capture and energy storage.

BACKGROUND

The electrical energy sector is undergoing a seismic shift to clean energy. The International Energy Agency report on a roadmap to net zero carbon emissions by 2050 envisions fundamental changes in the rapidly growing global electric energy sector, currently the single largest source of $CO_2$ emissions. It is expected that there will be: 1) a dramatic growth in solar and wind power, which owing to their variable power generation need to be paired with electrical energy storage, 2) a phasing out of the least-efficient coal plants, and 3) retrofitting of the remaining coal- and natural gas-fired plants for post-combustion carbon capture utilization and storage. In other words, carbon capture and storage and electrical energy storage are the two pillars that will allow the realization of a net-zero electric power sector.

The International Energy Agency expects that there will be a dramatic growth in electric power generation from the current 23,230 TWh to roughly 60,000 TWh by 2050. This is in part due to electrification of the other large energy consuming sectors, e.g., transportation, housing, and manufacturing. It is further expected that 70% of the global electric power by 2050 will be generated via wind and solar power. Because of the intermittent nature of these renewable generators there is expected to be a concomitant growth in grid-scale battery energy storage, including that based on redox flow batteries (RFBs), so that the temporal differences between energy generation and energy demand can be leveled out.

It is expected that a significant fraction of electric power will continue to be generated in fossil-fueled plants, e.g., in natural gas combined cycle (NGCC) power plants that are retrofitted with a carbon capture (CC) plant to reduce their $CO_2$ emissions. The abated NGCC plants may play a prominent role for a number of reasons. These include the abundant natural gas supply at a low price, a lower carbon footprint than other fossil fuels such as coal, and the fact that the modern NGCC plant designs are highly efficient and, unlike coal and nuclear plants, can rapidly ramp up or down to accommodate grid variability, which is expected to be further exacerbated with the anticipated exponential growth of the renewable (but intermittent) generators.

SUMMARY

Disclosed are electrochemical cells and methods that allow a combination of electrochemical energy storage (eES) and electrochemical carbon capture (eCC). An efficient and scalable carbon-capturing redox-flow battery (CC-RFB) is described that synergistically combines electrical energy storage and grid arbitrage with capture of carbon-dioxide either directly from air or from a point source such as a flue gas from a power generating or a manufacturing plant. The captured pure carbon-dioxide is suitable for compression, transportation, and geological storage, or as an industrial feedstock. The CC-RFB cell is powered by renewable electricity generators, fossil-fuel power plants, or directly from the grid for energy storage. The CC-RFB cell electrochemically maintains a pH differential between two electrodes via a uniquely structured membrane-electrode assembly (MEA) that boosts the cell voltage dramatically to provide efficient energy storage with high areal power densities.

The CC-RFB accomplishes the twin objectives of efficient carbon-dioxide capture and electrical energy storage in a single electrochemical cell by creating an internal pH differential maintained via a novel process and cell structure that contains two porous electrodes, with or without an appropriate catalyst, that flank a three-layer assembly consisting of an intermediate neutralye layer (NL) sandwiched between two ion-exchange membranes (IEMs) for selective transport of cations and/or anions. The CC-RFB maintains electrolyte at the negative electrode at a high pH needed to efficiently absorb carbon-dioxide in situ or in a separate absorber, and at the positive electrode at a low pH, so that the absorbed carbon-dioxide may be released as a pure gas in the NL. The pH differential further enhances the cell potential and power density for cost-effective energy storage.

The two electrolytes may contain distinct or the same redox-active species to facilitate electron transfer reactions at the electrodes. These redox-active species are refreshed chemically or electrochemically, the latter in the discharge phase in a reverse process when the cell produces power, supplying it either to recharge the cells or supplying it back to the grid. In some embodiments, the individual CC-RFB cells are arranged and operated in stacks.

One example of a net-negative application of the CC-RFB cell is in conjunction with a solar cell plant or a windmill farm, where it provides the requisite energy storage to overcome the variability of these renewable power generators, and concomitantly accomplishes direct air capture of $CO_2$. In another carbon-neutral example of its application, the CC-RFB replaces the conventional amine-based plant for capture of $CO_2$ from the flue gas of an NGCC power plant while providing grid-scale energy storage, allowing the NGCC plant to operate under steady and optimal conditions and increasing its efficiency while enhancing profitability via arbitrage. A third example is carbon capture from the exhaust of a carbon intensive manufacturing plant such as a cement kiln, blast furnace, or fermentation ethanol plant, and simultaneously providing large-scale electrical energy storage of renewable or fossil energy for use within the manufacturing process and/or for supporting the increasing grid variability. The scale of such applications can vary over several orders of magnitude.

In further detail, example configurations below depict a flow electrochemical cell with a negative electrode configured to be in fluid communication with alkaline negative electrolyte, and a positive electrode configured to be in fluid communication with acidic positive electrolyte. The flow electrochemical cell also includes a first ion-exchange membrane in contact with the negative electrode, and a second ion-exchange membrane in contact with the positive electrode. An inert intermediate neutralyte layer between the first ion-exchange membrane and the second ion-exchange membrane is configured to maintain a pH differential between the negative electrode and the positive electrode.

The described electrochemical negative emissions technology not only reduces emissions by directly removing carbon dioxide from air, or from the exhaust streams of power generation and manufacturing plants, but also indirectly by allowing the power generation to become more efficient and renewable via grid level electricity storage.

DETAILED DESCRIPTION

Disclosed are electrochemical cells and methods that allow a combination of electrochemical energy storage (eES) and electrochemical carbon capture (eCC). An efficient and scalable carbon-capturing redox-flow battery (CC-RFB) is described that synergistically combines electrical energy storage and grid arbitrage with capture of carbon-dioxide either directly from air or from a point source such as a flue gas from a power generating or a manufacturing plant. The captured pure carbon-dioxide is suitable for compression, transportation, and geological storage, or as an industrial feedstock. The CC-RFB cell is powered by renewable electricity generators, fossil-fuel power plants, or directly from the grid for energy storage. The CC-RFB cell electrochemically maintains a pH differential between two electrodes via a uniquely structured membrane-electrode assembly (MEA) that boosts the cell voltage dramatically to provide efficient energy storage with high areal power densities.

The alkaline electrolyte (e.g., the negative electrolyte or negolyte) is able to remove as much as 75% $CO_2$ directly from air, or up to 99% of $CO_2$ from flue gas of a chemical or a power plant in a packed gas-liquid contactor. The captured $CO_2$ is released in the CC-RFB cell stack powered by an external source such as a NGCC power plant or a solar/wind generator. Simultaneously, the cell gets charged by restoring the soc of the active redox component, as in an RFB. Once fully charged, the cell can be used in the discharge mode to power the grid or provide part of the power needed by stacks in the eCC mode, with the remaining coming from the power generator. Because of the cell internal irreversibilities and the resultant losses, supplemental auxiliary power is needed from the associated fossil or renewable power plant/grid even if all of the stored power is returned. The relative fraction of the auxiliary to battery power is varied depending on the grid demand and pricing, and the saved energy sold at a higher price during periods of higher demand. Such energy arbitrage can be an attractive component of the system economic viability.

System Description

Figure 1:
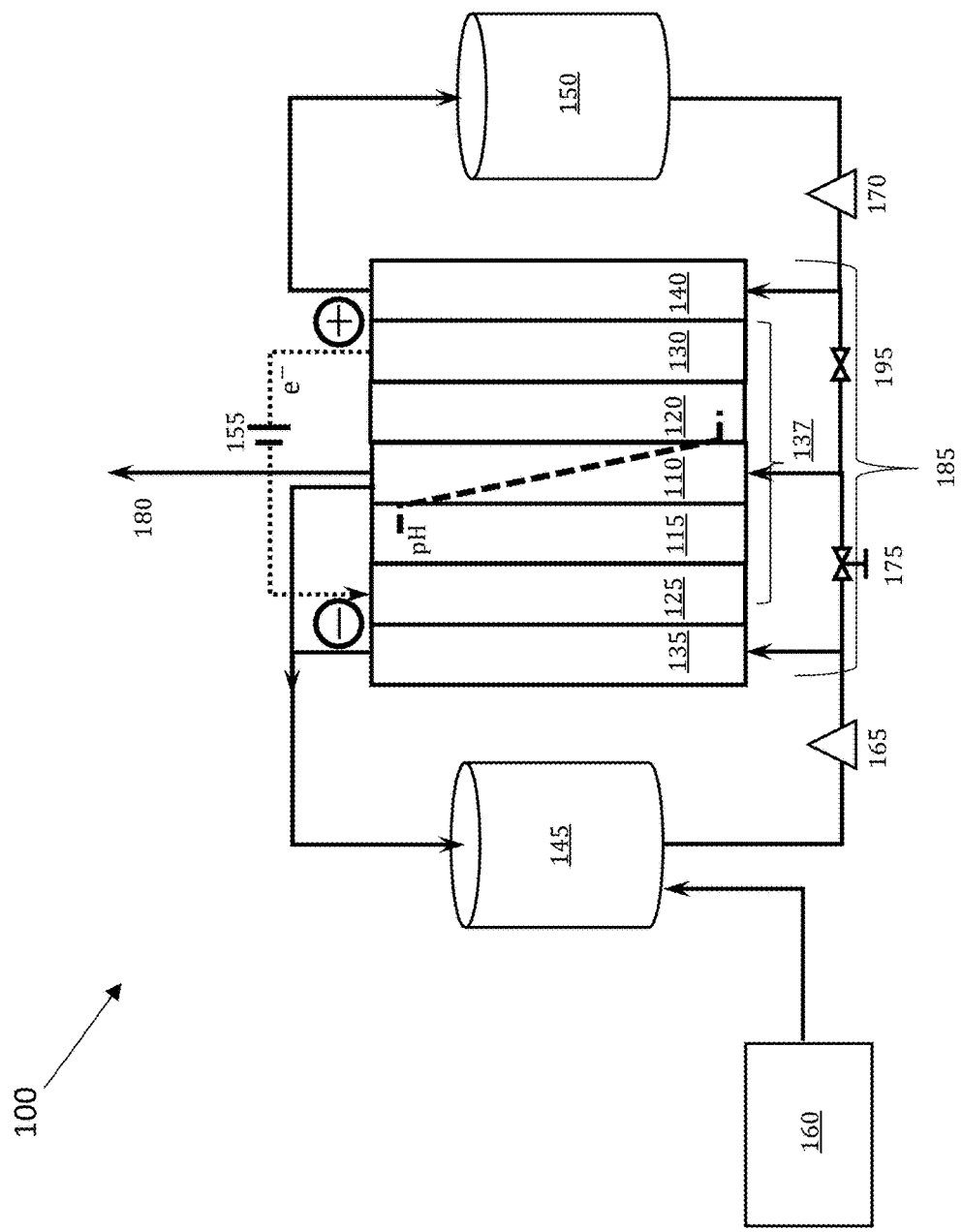
FIG. 1 is a schematic of a CC-RFB electrochemical carbon capture and energy storage cell in charge/carbon capture mode.

FIG. 1 illustrates the components of a CC-RFB cell 100 that combines $CO_2$ capture (CC) and energy storage (ES) in the same electrochemical cell. A central neutralyte layer (NL) 110 carries out an acid-base reaction and $CO_2$ release. The NL layer 110 is sandwiched between a first ion-exchange membrane or IEM1 115 and a second ion-exchange membrane or IEM2 120.

IEM1 115, the neutralyte layer 110 and IEM2 120 are interposed between a negative electrode 125 and a positive electrode 130, forming a five-layer membrane-electrode assembly (MEA) 137. The MEA 137 is denoted as ⊖-IEM1-NL-IEM2-⊕, referring in order to the negative electrode 125, IEM1 115, the NL 110, IEM2 120, and the positive electrode 130. The MEA 137 is placed between two bipolar plates with electrolyte flow distribution channels, an alkaline negolyte chamber 135 on the negative side of the cell and an acidic positive electrolyte or posolyte chamber 140 on the other side. The MEA 137 and two chambers 135, 140 together form a reactor unit 185. The arrangement with two IEMs 115, 120 sandwiching the NL 110 allows increase and decrease of the pH between the electrolytes without their intermingling, as depicted in FIG. 1.

The alkaline negolyte chamber 135 is in fluid communication with a carbonated alkaline negolyte tank 145 via a pump 165 configured to transport the negolyte fluid therebetween. The acidic posolyte chamber 140 is in fluid communication with an acidic posolyte tank 150 via second pump 170 configured to transport the posolyte fluid therebetween.

Via the alkaline negolyte chamber 135 and acidic posolyte chamber 140, the respective electrodes 125, 130 are in external fluid communication with sources of redox molecules for each electrode 125, 130; a posolyte for the positive electrode 135, and a negolyte for the negative electrode 125. The negolyte contains ions bearing $CO_2$ captured in an external gas-liquid absorber 160. The gas-liquid absorber 160 contains the same negolyte as in the negolyte tank 145, and captures $CO_2$ therein (e.g., through bubbling $CO_2$ through the liquid negolyte). $CO_2$ bearing electrolytes accordingly are in fluid communication between the absorber 160 that acts as an upstream source for the negolyte tank 145. In some embodiments, the gas-liquid absorber 160 and the negolyte tank 145 are combined.

The CC-RFB cell 100 (e.g., the reactor unit 185) is in external electronic communication with an energy source and energy sink, denoted generally as load 155. When the CC-RFB cell 100 is in a discharging mode, the load 155 acts as an energy sink, receiving energy stored within the CC-RFB cell 100. For example, the load 155 can be a single device, or an electrical grid in the case of a large-scale CC-RFB unit (described below with respect to FIG. 2). When the CC-RFB cell 100 is in charging mode, the load 155 supplies energy to the CC-RFB cell 100 to drive the electron transfer and the ion transport processes necessary to maintain the desired pH differential across the MEA 137. For example, the load 155 when in charge mode can be a renewable or fossil-fueled electric energy source. Alternatively, the chemical energy of a fuel, e.g., hydrogen, and/or an oxidant, e.g., oxygen, can drive the process.

Concerning the electrochemical capture of $CO_2$, the CC-RFB cell 100 uses a spatial pH differential for the segregation of absorption and desorption steps of $CO_2$ with the use of a unique cell structure of ⊖-IEM1-NL-IEM2-⊕ for the MEA 137. Such a structure has not so far been used for electrochemical $CO_2$ capture.

IEM combinations for sandwiching the NL 110 can include a combination of a cation-exchange membrane (CEM) and an anion-exchange membrane (AEM). The CC-RFB cells disclosed herein use combinations not known so far, e.g., an ⊖-AEM1-NL-AEM2-⊕, and a ⊖-CEM1-NL-CEM2-⊕ combination for the MEA 137. The latter combination is especially effective in the design of a cell with low internal resistance and excellent performance, along with a long cell life, as CEMs have higher conductivities than AEMs, are more durable, and are commercially better developed. While bipolar membranes can also in principle maintain a pH differential across it, that requires the use of energetically demanding water dissociation at the interface to maintain it.

The MEA 137 can have different possible combinations of for the different ⊖-IEM1-NL-IEM2-⊕ components. These combinations include a) a ⊖-AEM1-NL-CEM2-⊕ combination; b) a ⊖-CEM1-NL-AEM2-⊕ combination; c) a ⊖-CEM1-NL-CEM2-⊕ combination; and d) a ⊖-AEM1-NL-AEM2-⊕ combination. In other words, there are two possible arrangements for the mixed IEM case (cases (a) and (b)), depending on their placement adjacent to a given electrode (positive or negative). Further, the physical and transport characteristics of CEM1 and CEM2, or AEM1 and AEM2 in cases (c) and (d) may be different depending on the nature of the ions involved.

The electron transfer reactions during discharge at the negative electrode 125 result in the generation of the OH⁻ neucleophile in the negolyte, according to

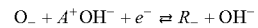

where the cation $A^+ = Na^+$, $K^+$, $Li^+$, etc., for basic electrolytes. As a result of the generation of the hydroxyl ion, there is an increase in the pH of the negolyte, thus facilitating $CO_2$ capture, e.g., in a sparged packed column contactor, or in a tank like tank 145, or even directly at the negative electrode 125. The reaction results in the formation of bicarbonate and carbonate anions, as described by the reactions

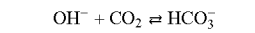
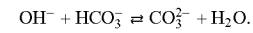

The resulting $CO_2$ bearing bicarbonate and carbonate anions are transported to the NL 110, the nature of the transport step depending upon the identity of IEM1 115; e.g., whether an AEM or a CEM is placed adjacent to the negative electrode 125 to form IEM1 115. In the case that IEM1 115 is an AEM, the anions can directly and selectively migrate across IEM1 115 from the negative electrode 125 to the NL 110 under the influence of an externally imposed electric field. If IEM1 115 is a CEM, then since the anions are precluded from it, the $CO_2$ enriched solution must be transported to the NL 110 via physical transport, such as with the assistance of the pump 165 and a valve 175 to control the flow rate. The result is that cations $A^+$ also accompany the bicarbonate and the carbonate anions to the NL 10. Subsequently, these are returned to the negative electrode 125 via selective cation migration through the CEM (that is in the place of the IEM1 115). The configuration of the ion-exchange membranes also determines whether the ions involved in the electrode reactions are also involved in charge transfer across the membrane, or whether this is accomplished by the counterions in the electrolyte or supporting electrolyte. In other words, the charge transfer ions are not limited to those OH⁻, $HCO_3^-$, $CO_3^{2-}$ and $H^+$, but can also be those in the supporting electrolyte. This allows for a great degree of freedom in determining the CC-RFB cell 100 design and the nature of the electrode and transport processes.

The net result in either scheme is the transport of $CO_2$-bearing anions to the NL 110, where they encounter protons arriving from the positive electrode. Thus, the reactions in the NL 110 resulting in the release of $CO_2$ are:

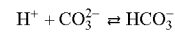
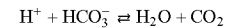

In addition, acid-base neutralization reactions can occur, namely, OH⁻+H⁺⇌H₂O. The protons needed for acidification and the consequent release of $CO_2$ in the NL are replenished at the positive electrode via the reaction

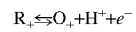

and are similarly transported to the NL 110 either via migration or convection depending on the nature of IEM2 120. When IEM2 120 adjacent to the positive electrode 130 is a CEM, $H^+$ can directly migrate across IEM2 120 to the NL 110. If IEM2 120 is an AEM, then the acidified solution at the positive electrode 130 must be transported to the NL 110 via convection, by opening valve 195 and with the help of a pump 170, also accompanied by counter anions, which are then returned to the chamber 140 via ion migration across the AEM that forms IEM2 120.

Alkalinity is restored in the negolyte during charge mode via electrochemical generation of $OH^-$ ions, and acidity in the posolyte via generation of protons, $H^+$. The restored alkaline negolyte is then used to capture $CO_2$ from a point source, or from air, in a separate absorber 160 or within the CC-RFB, and the resulting $CO_2$-bearing anions are eventually transported to the NL 110 where they bind with protons under the prevailing acidic conditions, releasing the $CO_2$ as a pure gas, e.g., via outlet 180.

Because of the finite capacity of the negolyte tank 145 and posolyte tank 150, the state of charge (soc) of the active components in the negolyte and the posolyte changes with time, as would the efficacy of the device for CC and ES. Thereafter, steps must be taken to restore the redox molecules to their original state. This can be accomplished either chemically, or more conveniently electrochemically in the same cell, by simply reversing the process, or by operating the cell in discharge mode, and in the absence of $CO_2$ generation, when it can produce power that may be used for a variety of purposes, including grid arbitrage.

During the discharge cycle of such a cell, since $CO_2$ is not involved, the reactions are limited, e.g., to the following

| Electrode | Reaction |
| --- | --- |
| Negative, NL, | $R_- + OH^- \rightleftarrows O_- + AOH + e^-$ |
|  | $H_2O \rightleftarrows H^+ + OH^-$ |
| Positive, | $O_+ + H^+ + e^- \rightleftarrows R_+$ |
| Cell OR: | $R_- + H_2O + O_+ \rightleftarrows O_- + AOH + R_+$ |

The relative significant of the CC and energy storage functions of the device for a particular application can be tailored by choosing appropriate redox couples and the resulting cell voltage. If the goal were, for instance, to couple significant energy storage function with carbon capture in the cell, then selection of the redox couples should be such that the cell voltage of the selected redox pairs is high, as further enhanced by the pH differential. In some embodiments, a cell has a voltage that exceeds roughly 1.5-1.6 V, which is typically the limit in aqueous systems if one wishes to avoid water splitting and the resulting oxygen evolution reaction (OER) and/or the hydrogen evolution reaction (HER) at either electrode. In some embodiments, cell voltage as high as 2 V is possible in the CC-RFB cell 100 with a pH differential.

Figure 2:
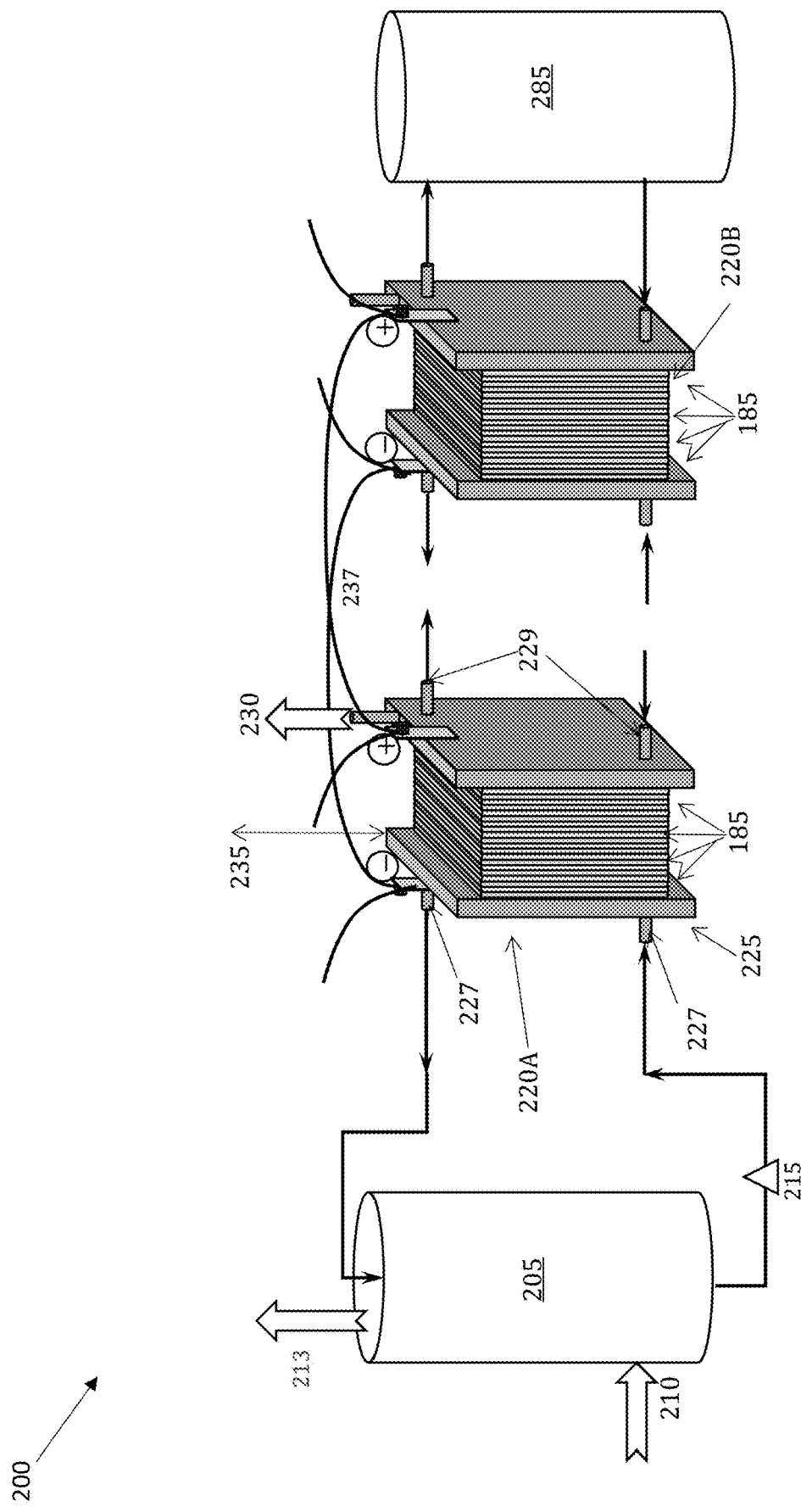
FIG. 2 is a schematic of a plant showing an absorber for absorbing $CO_2$ and electrochemical CC-RFB cells as described in FIG. 1 in stacks.

FIG. 2 shows a plant arrangement 200 using multiple CC-RFB cells 100 as described in FIG. 1. In the plant arrangement 200 a $CO_2$ absorber 205 receives flue gas or air via an inlet 210 and stores $CO_2$, with decarbonized flue gas or air exiting via outlet 213. The absorber 205 can also act as the negolyte tank 145 described with respect to FIG. 1. $CO_2$ and negolyte are transferred (e.g., via a pump 215) to a stack 220A. The stack 220A is made up of a plurality of reactor units 185 such as described with respect to FIG. 1. Each reactor unit 185 is configured to carry out energy storage and $CO_2$ capture.

The stack 220A includes a fluidic housing 225. The fluidic housing 225 contains the reactor units 185 therein, conducts negolyte into and out of the stack 220A (e.g., to and from the absorber 205 or a negolyte tank) via negolyte ports 227 and conducts posolyte into and out of the stack 220A via posolyte ports 229 to and from a posolyte tank 285. The fluidic housing 225 also conducts $CO_2$ out of the stack 220A (via an outlet 230) and conducts electrical charge into or out of the stack 220A to/from load 235 according to if the stack 220A is being charged or discharged.

The plant arrangement 200 can include a second stack 220B. Two stacks 220A, 220B are shown in FIG. 2 but three, four, ten, or more stacks are possible. In some embodiments, the second stack 220B can be in communication with the same absorber 205 as is stack 220A and/or the same posolyte source as is stack 221A. In some embodiments, the second stack 220B or can be in communication with a different absorber and/or fluid tanks. In some embodiments, the first stack 220A can be electrically connected to the second stack 220B via electrical connections 237. Electrical connections allow electrical communication between the stacks 220A, 220B. For example, the first stack 220A can be charged from the load 235 and then the stored charge transferred to the second stack 220B (e.g., the first stack 220A can be used to charge the second stack 220B). In some embodiments, some stacks in the plant arrangement 200 can be in energy storage mode while other stacks are in discharging mode, and some stacks can be capturing $CO_2$ and some stacks not.

Scientific Basis

The separation of $CO_2$ from air or from a point source generally involves the following steps: 1) $CO_2$ capture from the dilute gas using an absorbent solution or an adsorbent solid, 2) release of concentrated $CO_2$ from the absorbent/adsorbent via a thermal, pressure, chemical, or electrochemical swing, 3) compression, and 4) geological storage, or further processing.

Figure 3:
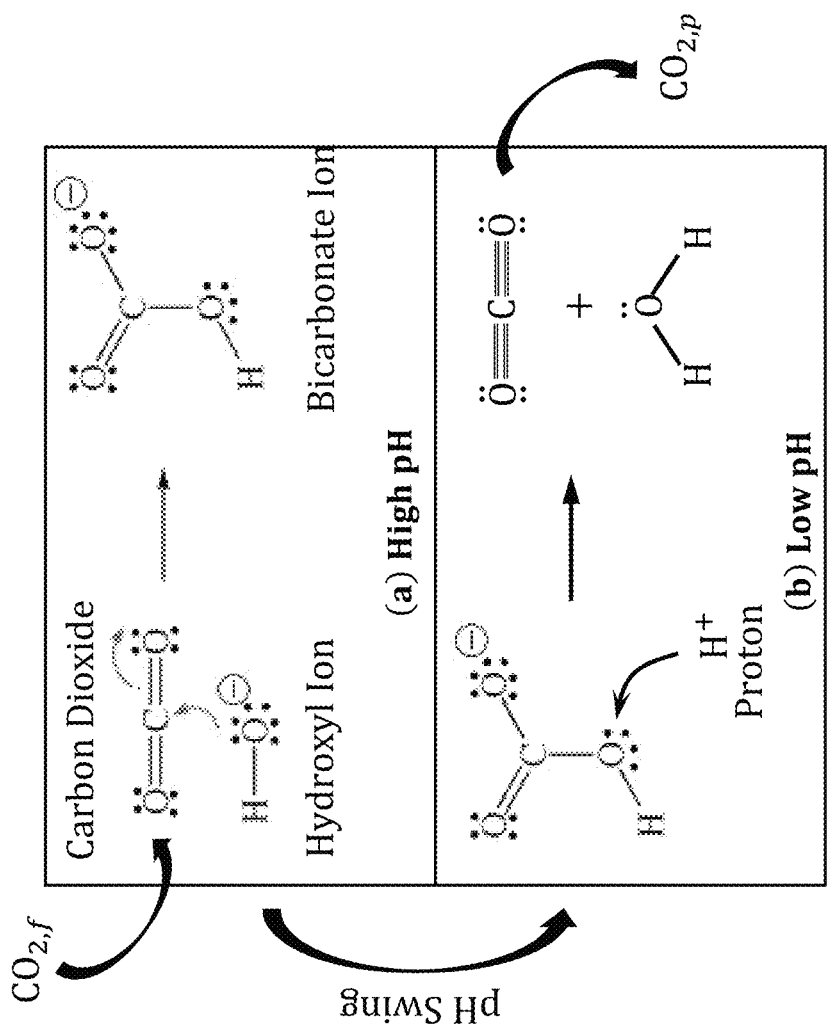
FIG. 3 is a diagram of a reaction of produced bicarbonate with proton to release a $CO_{2,p}$ product at a low pH and a diagram of the reaction of electrophilic $CO_{2,f}$ in feed with a nucleophilic hydroxyl ion, $OH^-$, in a high pH electrolyte showing transfer of electrons.

For the absorption/adsorption step, the underlying chemical scheme shown in FIG. 3 (top portion) exploits the fact that the carbon in $CO_2$ is electrophilic, or electron-loving, and binds to nucleophilic, i.e., positive charge loving, species. For example, the hydroxyl ion, $OH^-$ in a high pH aqueous electrolyte solution, which has an excess electron density on its oxygen, and readily reacts with $CO_2$, forming a C—O bond and resulting in a bicarbonate ion, as shown schematically in FIG. x1(a), which in solution is counterbalanced with a cationic species generically denoted here as $A^+$. For instance, $A^+=H^+$, $Li^+$, $Na^+$, $K^+$, etc.

For the recovery step, if the $CO_2$-bearing bicarbonate anion is next exposed to acidic conditions, or a lower pH, the strongly electrophilic proton binds with the nucleophilic oxygen in the OH group forming water and releasing the $CO_2$, as shown in FIG. 3 (the bottom portion of the figure). A pH swing can, thus, be used to capture $CO_2$. This principle is utilized in the CC-RFB cell by electrochemically generating the pH swing.

Figure 4:
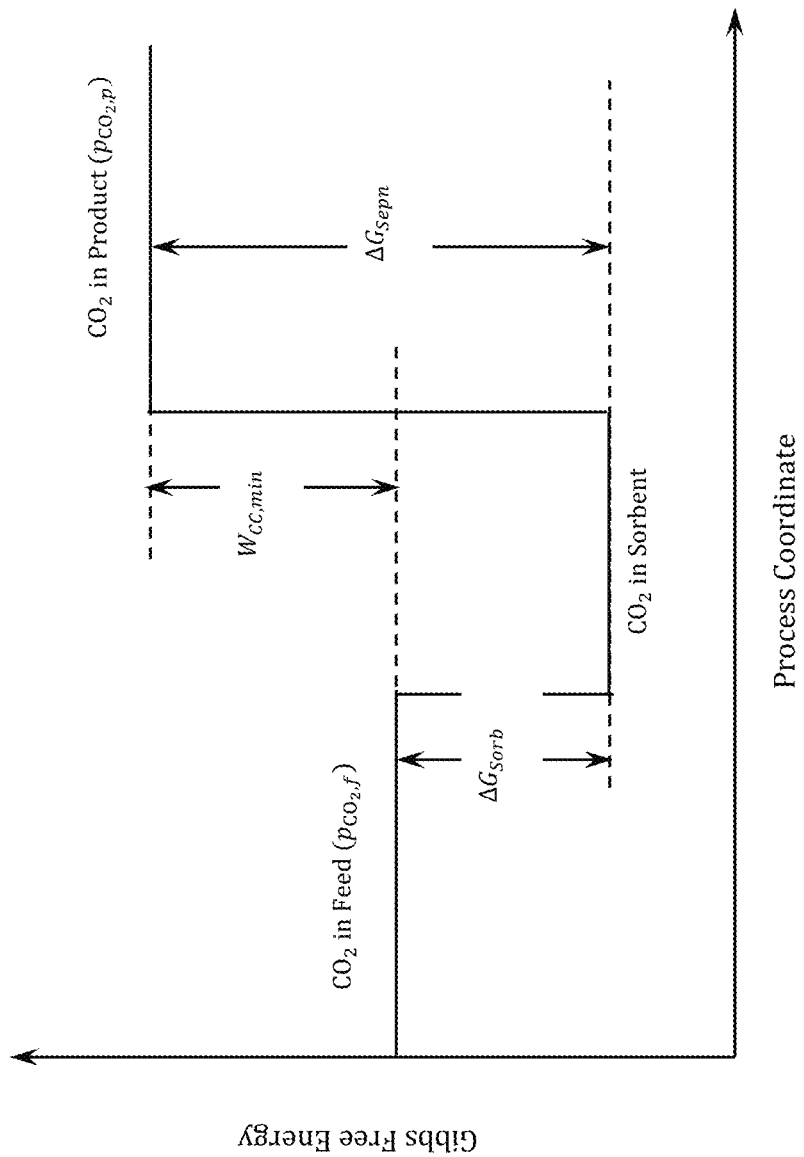
FIG. 4 is a diagram showing the Gibbs free energy landscape for $CO_2$ sorption and separation.

As depicted in FIG. 4, the $CO_2$ absorption/adsorption step is exothermic and exergonic, or spontaneous, while the subsequent stripping step is endothermic and endergonic, thus requiring expenditure of energy, more so for sorbents with stronger affinity for $CO_2$. The choice of sorbent material needed is dependent also on the strength of the $CO_2$ source. Thus, stronger reagents, e.g., alkali solutions of NaOH, KOH, LiOH, etc., are required for treating very dilute sources such as ambient air or in a space capsule, but then recovery of $CO_2$ from the resulting strongly bound compounds becomes correspondingly more challenging. For more concentrated sources of $CO_2$ such as a flue gas, amine solutions are adequately strong for absorption.

The minimum thermodynamic work of carbon capture, from a source with a $CO_2$ partial pressure of $P_{CO_{2,f}}$ to a product with $p_{CO_{2,p}}$, is $$W_{CC,min} = \frac{RT}{MW_{CO_2}} \ln\left(\frac{p_{CO_2,p}}{p_{CO_2,f}}\right) =$$

$$\frac{8.314 \times 298}{44} \ln\left(\frac{1}{0.00041}\right) = 0.44 \text{ GJ } t^{-1} CO_2 = 0.12 \text{ MWh } t^{-1} CO_2$$

where R is the gas constant, T the temperature, and $MW_{CO_2}$ is the molecular weight of $CO_2$. The calculation for minimum work of producing pure $CO_2$ from ambient air with a mole fraction $x_{CO_2}=410$ ppm is provided above as an example. The dilute conditions in air recommend the use of a sorbent with a strong affinity.

The electrochemical carbon capture methods, in general, rely on regenerating the nucleophilic and electrophilic species, e.g., $OH^-$ and $H^+$ ions, electrochemically, so that they can again in the next cycle participate to capture and subsequently release $CO_2$. The nature of the active species depends on the electrolyte phase, i.e., whether it is an aqueous or a nonaqueous phase. In the former, e.g., the nucleophile that binds to $CO_2$ is almost invariably the $OH^-$ ion, while in the latter it can vary.

Unlike traditional batteries, RFBs are more akin to regenerative fuel cells, in which the electrical energy is stored as the chemical energy of redox active materials contained in a liquid solution that also contains the charge transfer ions. Unlike traditional batteries where the active materials are stored within the cell, the electrolyte solution in RFBs is stored externally in tanks and simply flows in and out of a rechargeable cell. Thus, the power and energy capacity of an RFB energy storage system are decoupled, offering design flexibility and potentially lower costs by optimizing power versus storage capacity.

The RFB is, thus, composed of two half-cells, each with its own redox-active couple, $R_+/O_+$ and $R_-/O_-$, the subscripts referring to the positive and negative electrodes, respectively, which cycles between its two different oxidation states, e.g., $R_-$ and $O_-$, via facile and reversible electrode reactions. The electrode and the cell overall reactions (ORs) are of the general form $$-ve: R_- \rightleftarrows O_- + nA^+ + ne^-$$

$$+ve: O_+ + nA^+ + ne^- \rightleftarrows R_+$$

$$\text{Cell: } R_- + O_+ \rightleftarrows O_- + R_+$$

written for a cell in discharge mode, and in the reverse direction for the charge mode. The above scheme is based on cations ($A^+=H^+, Li^+, Na^+, K^+$, etc.) as the charge transfer ion between the two electrodes separated by a CEM, which allows their selective transport between the negolyte and the posolyte, the electrolyte solutions at the negative and positive electrodes, respectively, while electrons are exchanged between the two via external circuit. Alternately, anions may be used as the charge transfer ions based on the use of an AEM separating the two RFB electrodes and the corresponding electrolytes.

The effect of pH on $CO_2$ dissolution and subsequent evolution may be quantified based on the pH-dependent thermodynamics of $CO_2$ capture steps: 1) dissolution (Henry's Law), and the subsequent formation of 2) bicarbonate and 3) carbonate ions, i.e., $$CO_2(g) \rightleftarrows CO_2(aq);$$

$$\kappa_{CO_2} = \frac{c_{CO_2(aq)}}{c_{CO_2(g)}} = 0.83$$

$$CO_2(aq) + H_2O \rightleftarrows H^+ + HCO_3^-;$$

$$K_{a1} = \frac{c_{HCO_3^-} a_{H^+}}{c_{CO_2(aq)}} = 10^{-6.35}$$

$$HCO_3^- \rightleftarrows H^+ + CO_3^{2-};$$

$$K_{a2} = \frac{c_{CO_3^{2-}} a_{H^+}}{c_{HCO_3^-}} = 10^{-10.33}$$

where the values of the partition coefficient of dissolution, $K_{CO_2}$, and the equilibrium constants for the subsequent ionization steps, $K_{a1}$ and $K_{a2}$, are given at 25° C.

Figure 5:
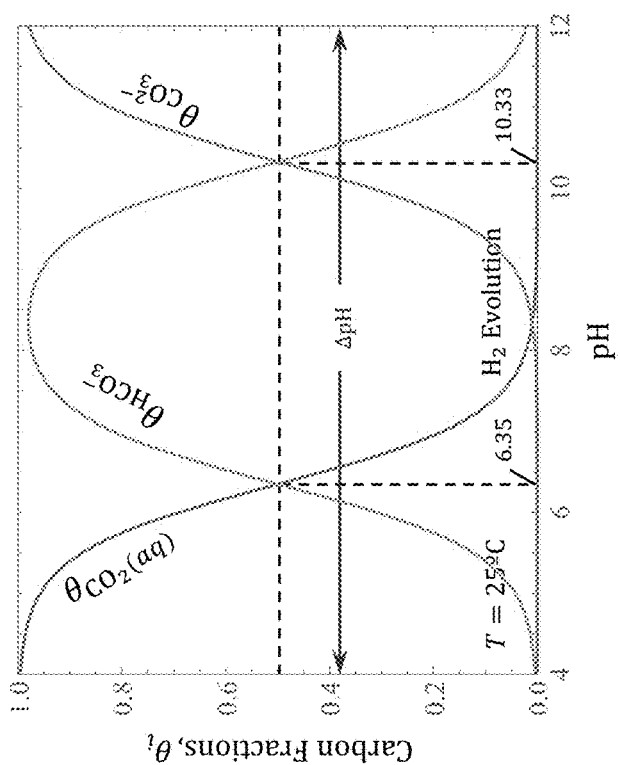
FIG. 5 is a graph showing the effect of pH on the fraction of carbon species in aqueous solutions at 25° C.

FIG. 5 shows the fraction of the different carbon species to total dissolved carbon in solution are plotted using these relations. It is seen that when pH<4, or under acidic conditions, $CO_2$ is present simply as a dissolved gas, $CO_2(aq)$. As pH increases, bicarbonate ion, $HCO_3^-$, is first formed, peaking at a pH of roughly 9. As the pH increases further, or under strongly alkaline conditions, carbonate ion, $CO_3^{2-}$ becomes predominant. It is further evident that a pH differential in the range of roughly ≤4 and ≥11 is desirable for the release and solution of $CO_2$, respectively. This is the basis of the release of the captured $CO_2$ as a pure gas in the NL, where the pH is lower due to protonation. The CC-RFB cell sustains the pH differential with an IEM-NL-IEM sandwich, which has not been done so far.

The pH differential needed in the cell for electrochemical carbon capture is additionally exploited to enhance energy storage in the CC-RFB by significantly enhancing its potential. The basis for this provided in FIG. 6, which plots a Pourbaix diagram for the $H_2$—$O_2$ system, i.e., the standard electrode equilibrium potential for the hydrogen electrode reaction (HER), and that for the oxygen electrode reaction (OER), as a function of pH, which can be obtained from the Nernst equation.

Thus, the Nernst potential for the negative electrode $$\Phi_{-,0} = (\Phi_{-,0}^o)_{pH=0} + \frac{RT}{nF} \ln\left(\frac{1-soc_-}{soc_-}\right) - 2.3026\left(\frac{RT}{F}\right)pH_-$$

while that for the positive electrode $$\Phi_{+,0} = (\Phi_{+,0}^o)_{pH=0} + \frac{RT}{nF} \ln\left(\frac{soc_+}{1-soc_+}\right) - 2.3026\left(\frac{RT}{F}\right)pH_+$$

where n is the number of electrons transferred in the electrode reaction.

Consequently, the equilibrium Nernst potential of a cell comprising of the two electrodes or half cells, $V_0=\Phi_{+,0}-\Phi_{-,0}$, along with assuming that $soc_+=soc_-=soc$, during discharge (denoted via a forward arrow, →), thus, is $$\vec{V}_0 = (V_0^o)_{pH=0} + \frac{RT}{nF} \ln\left(\frac{soc}{1-soc}\right)^2 + V_{\Delta pH}$$

where the standard cell potential at pH=0, $(V_0^o)_{pH=0} = (\Phi_{+,0}^o)_{pH=0} - (\Phi_{-,0}^o)_{pH=0}$, while the additional cell potential due to the pH differential $$V_{\Delta pH} = 2.3026\left(\frac{RT}{F}\right)(pH_- - pH_+)$$

For example, for the $H_2$—$O_2$ system (FIG. 6) at 298 K, the standard cell potential, $(V_0^o)_{pH=0}=1.229$ V, while the potential change due to pH differential for $pH_-=0$, and $pH_+=14$, $$V_{\Delta pH} = 2.3026\left(\frac{8.314 \times 298}{96,485}\right)(14 - 0) = 0.828 \text{ V}$$

Figure 6:
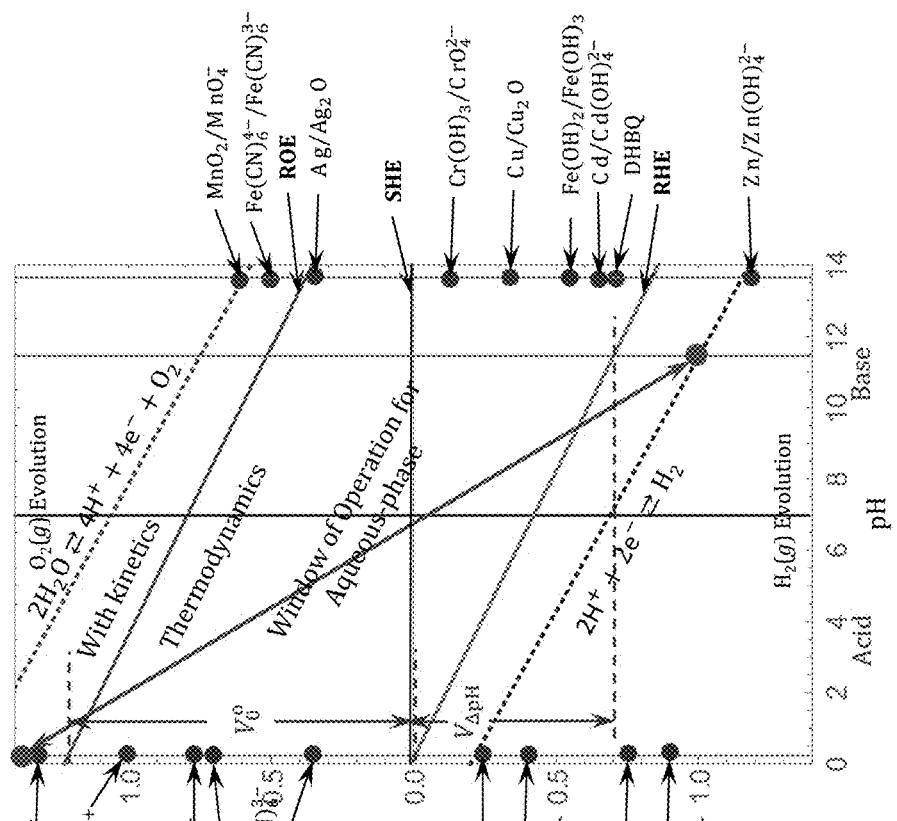
FIG. 6 is a Pourbaix diagram for an $H_2$—$O_2$ system, plotting the electrode equilibrium potential the hydrogen evolution reaction and that for the oxygen evolution reaction as a function of pH, along with some exemplary redox couples.

In other words, the voltage of a cell may be boosted by as much as 800 mV via an appropriate pH differential between an alkaline negative electrode and an acidic positive electrode, as indicated schematically by the diagonal line in FIG. 6.

This principle applies not just to the $H_2$—$O_2$ cell but to pH dependence of other redox chemistries as well, as described by their respective Pourbaix diagrams. However, the individual redox couples for the negative and positive electrode in aqueous electrolyte batteries are chosen such that water electrolysis and the resulting hydrogen evolution reaction (HER) at the negative electrode, and the oxygen evolution reaction (OER) at the positive electrode may be avoided. Thus, the shaded region in FIG. 6 indicates the window of operation as limited by this need to avoid water electrolysis, including roughly the kinetic overpotentials beyond the equilibrium potentials for HER and OER. Any redox couple(s) chosen for the cell must be adequately soluble and remain at the chosen pH. In addition, the redox couple chosen for the negative electrode must not be overly sensitive to oxygen, to which the negolyte is copiously exposed in the $CO_2$ absorber.

As mentioned above, while there are a handful of RFB reports in the literature that seek to thus exploit a pH differential to boost the cell voltage, they invariably employ a ⊖-CEM-NL-AEM-⊕ combination, or a bipolar membrane (BPM) with a similar configuration of its layers. Our approach is more general and involves other ⊖-IEM1-NL-IEM2-⊕ combinations, including twin CEMs, or twin AEMs.

Finally, during discharge/power producing phase (denoted via a forward arrow,→), the Nernst potential must also include a term for $CO_2$ capture, i.e., $$\vec{V}_0 = \vec{V}_0 + V_{0,CC}$$

where $V_{0,cc}$ is the thermodynamic potentials pertaining to carbon capture, which, e.g., for the case of producing a pure $CO_2$ stream from a feed stream with $CO_2$ of mole fraction, $x_{CO_2,f}$ $$V_{0,CC} = \left(\frac{RT}{n_{CC}F}\right)\ln\left(\frac{p_{CO_2,p}}{p_{CO_2,f}}\right) = \left(\frac{RT}{n_{CC}F}\right)\ln\left(\frac{1}{x_{CO_2,f}}\right)$$

where $n_{CC}$ is the number of electrons transferred per molecule of $CO_2$ captured. Thus, $n_{CC}=1$, for $HCO_3^-$, and $n_{CC}=2$, for $CO_3^{2-}$. If both reactions occur to an appreciable degree, we may assume, $n_{CC} \approx 1.5$. The corresponding thermodynamic minimum work of separation, $$W_{CC,min} = \frac{V_{0,CC}(n_{CC})F}{MW_{CO_2}}$$

which is independent of $n_{CC}$. As an example, the minimum work of enriching $CO_2$ from the ambient environment (400 ppm $CO_2$), at 25° C.

$$W_{CC,min} = \frac{RT}{MW_{CO_2}}\ln\left(\frac{1}{x_{CO_2,a}}\right) = 8.314 \times 2.98 \ln\left(\frac{1}{0.0004}\right) = 0.44 \text{ GJ } t^{-1}CO_2$$

Further, the $CO_2$ flux to the NL $$N_{CO_2} = \frac{i}{n_{CC}F}$$

The actual cell voltage for a cell in either the charge or the discharge mode is $$V = V_0 + \frac{RT}{\alpha_+ F}\sinh^{-1}\left[\frac{1}{2}\left\{\frac{i/(\varepsilon_+ i_{+,0})}{1-|i/(\varepsilon_+ i_{+,L})|}\right\}\right] + \frac{RT}{\alpha_- F}\sinh^{-1}\left[\frac{1}{2}\left\{\frac{i/(\varepsilon_- i_{-,0})}{1-|i/(\varepsilon_- i_{-,L})|}\right\}\right] + i\left(\frac{L_{IEM1}}{\sigma_{IEM1}} + \frac{L_{NL}}{\sigma_{NL}} + \frac{L_{IEM2}}{\sigma_{IEM2}}\right) + i(R_I)$$

which applies to both charge phase (when $V=\overleftarrow{V}$ and i>0, as per the sign convention for the external current density i) and discharge phase (when $V=\vec{V}$ and i<0) modes. In the latter mode, thus, all the overpotential terms become subtracted from $\vec{V}_0$, as i<0, although the polarization relation remains unchanged. As a result, the actual cell voltage during discharge $\vec{V} \leq \vec{V}_0$. On the other hand, $\overleftarrow{V} \geq \overleftarrow{V}_0$ during charge.

In the above polarization expression, $V_0$ is the Nernst cell potential that is a function of soc and pH as discussed above, the second and third terms on the right represent kinetic and mass transfer overpotentials of the positive and negative electrodes, $\eta_+$ and $\eta_-$, respectively, $i_{+,0}$ and $i_{-,0}$ are the corresponding exchange current densities, $L_{+,L}$ and $i_{-,L}$ are the limiting current densities reflecting pore-level mass transfer limitations to the internal electrode surface, and $\varepsilon_r$ is the effectiveness factor reflecting ion transport limitations across the porous electrode thickness. The second-to-last term on the right includes the Ohmic potential drops in the IEM1-NL-IEM2 sandwich, where a is the ionic conductivity and L is the layer/membrane thickness. Finally, $R_1$ accounts for any electronic and interfacial contact resistance.

Next, the area-specific resistance (ASR) of the cell is defined by $$ASR \equiv \frac{V - V_0}{i}(\Omega \text{ cm}^2)$$

In addition, the power density, P E (i)V (W cm$^{-2}$). Like the polarization expression, these equations apply to both charge/carbon capture mode, e.g., $\vec{p} = i\vec{V} = \vec{i}(\vec{V})$, and discharge mode), i.e., $\vec{P} = i\vec{V} = \vec{i}(\vec{V})$. Here, $\vec{i} = \vec{i}$, and $\vec{i} = \vec{i}$ are both defined as >0. The power density in a RFB with a pH differential is higher since the cell voltage is higher. On the other hand, the cycle efficiency can be lower if the overpotential losses in the additional layers are not fully compensated by the higher potential An average battery energy efficiency may be defined for energy storage over a charge-discharge cycle, assuming that the conditions don't vary significantly over most of the cycle as the soc varies $$\overleftrightarrow{\varepsilon}_{ES} \equiv \frac{\int (-\vec{P})dt}{\int (\vec{P})dt} = \frac{\int (\vec{V})idt}{\int (\vec{V})idt} \approx \frac{\vec{i}(\vec{V})}{\vec{i}(\vec{V})} \approx \frac{\vec{V}}{\vec{V}}$$

where in the last expression it is assumed that $\vec{i} = \vec{i}$, i.e., the current density during charge and discharge is the same.

If the work expenditure attributable to carbon capture is that due to thermodynamic work of carbon capture, $V_{0,CC}$, plus twice (once during charge and again during discharge) the difference in overpotentials in a cell with nonuniform pH and that in a cell with uniform pH. Ignoring any kinetics differences, this is mainly due to the Ohmic resistances in the second membrane and the neutralyte layer, then, the energy efficiency of CC $$\varepsilon_{eCC} = \frac{V_{0,CC}/n_{CC}}{V_{0,CC} + 2\vec{i}\left(\frac{L_{CEM1}}{\sigma_{CEM1}} + \frac{L_{NL}}{\sigma_{NL}}\right)}$$

The above theoretical model provides guidance in terms of designing a system with high efficiency and low cost: 1) the efficiency being governed largely by the operating voltage; 2) while the cost is in large part determined by the choice of the redox system chosen for efficient electron transfer reaction, i.e., one that does not require use of expensive catalysts, along with a high operating current density.

The following guidelines are useful:
If the goal is simply carbon capture, then the cell voltage should be minimized to improve carbon capture efficiency. Thus, one should choose a redox system with a minimum $V_0^o$. In fact, if the same redox system is chosen for both the posolyte and the negolyte, the standard cell voltage $V_0^o = 0$. The chosen redox couple should be stable at the two different pHs at the two electrodes.
On the other hand, when energy storage is also a goal, the redox couples should be chosen so that $V_0^o$ is maximized.
Lowering $V_{\Delta pH}$ by using a lower pH differential is useful for carbon capture alone, but not for energy storage.
Reducing the electrode overpotentials at the two electrodes, $\eta_+$ and $\eta_-$. This would require redox couples with large exchange current densities. However, since $\eta_+$ and $\eta_-$ involve both kinetic and diffusion overpotentials, high concentrations of the redox species as well as of $CO_2$ is also useful.
Low potential drops in the two ion-exchange membranes, $\eta_{IEM1}$ and $n_{IEM2}$. Since CEMs, in general, have higher conductivities, use of two CEMs may be indicated rather than one or more AEMs. Further, lower thickness of the membranes is useful, but must be balanced with desire for a long life and robustness of the assembly.
Small overpotential in the intermediate layer, NL. This means that the thickness of the layer should be minimum, and concentration of any electrolyte should be high.

The cost of the unit may be reduced by:
Operating at higher current/power densities, so that stack area may be minimized
Selecting redox couples that are inexpensive with facile kinetics, so that there is little use for catalysts in the electrodes, and inexpensive graphite electrodes suffice.
Higher overall efficiency results when carbon capture is combined with energy storage function in the same cell. This has not so far been accomplished in the literature.

Component Selection

Based on the preceding discussion of the basic principles and general features of the proposed electrochemical carbon capture combined energy storage cell, it is clear that there is a large variety of options available for cell design, materials for the membranes and neutralyte layer, electrodes, and the composition of the posolyte (acidic), and the negolyte (alkaline) as further elaborated below.

The desired ion-exchange membranes (IEMs) used in the cell are selective ion conducting and electrically insulating membranes that also discourage cross-diffusion of other ionic and molecular species. The IEMs generally constitute a neutral polymer backbone bonded to repeating pendant ionomer units. The ion-exchange membranes in the present disclosure may be anion- or cation-exchange, conducting membranes, or both.

For cation-exchange membranes (CEMs), the pendant ionomer units include anionic functional groups including carboxylates, sulfonates, phosphonates, and the like. The strength of the pendant ionomer units, e.g., $-(COO^-)H^+$ versus $-(S_3^-)H^+$, is used to accomplish a desired pH in the membrane. For anion-exchange membranes (AEMs), these polymer compositions may include attached or embedded quaternary ammonium, imidazolium, sulfonium, phosphonium, phosphazenium, and guanidinium groups, or salts.

In CEMs, the pendant ionomer groups are charge-balanced by exchangeable cations such as mono-, di-, or higher-valent cations $A^+$, such as protons, $H^+$, and alkaline earth metals, such as $Li^+$, $Na^+$, $K^+$, $Mg^{2+}$, and $Ca^{2+}$. In AEMs, the pendant groups are charge-balanced by exchangeable anions such as mono-valent anions such as hydroxyl ions $OH^-$, halogen-based anions such as $Cl^-$, $Br^-$, and $I^-$, bicarbonate ion $HCO_3^-$, bisulfate ion $HSO_3^-$, and di-valent, or higher-valent anions such as the carbonate ion $CO_3^{2-}$, and sulfate ion $SO_4^{2-}$, etc.

An example of a membrane with fluorinated or perfluorinated polymer backbone is Nafion®, manufactured by E. I. du Pont de Nemours and Company, Wilmington, Delaware Non-fluorinated membranes include those with substantially aromatic backbones, e.g., polystyrene, polyphenylene, biphenyl sulfone (BPSH), or thermoplastics such as polyetherketones or polyethersulfones, and the like. Commercial manufacturers of AEMs include Fumatech (Germany), Solvay (Belgium), Tokuyama (Japan), Ionics (USA), Dioxide Materials (USA), and Asahi Glass (Japan).

In addition to active redox species, supporting electrolytes of different pH are used at either electrode to facilitate carbon dioxide capture and release, a desired cell potential, and charge transfer within the electrode for energy storage. Any supporting electrolyte, in combination with any redox species, used at the positive electrode is called posolyte, while such a solution used at the negative electrode is called negolyte.

The supporting electrolytes comprise of an aqueous or nonaqueous solvent along with salts, acids, or bases to aid in ionic conductivity, as well as to provide the counterions for the redox species. The supporting electrolyte in itself is generally redox inactive in the window of electric potentials of interest. Examples include salts of an alkali metal, ammonium ion including an animonium ion partially or wholly substituted by alkyl or aryl groups, halide, chalcogenide, phosphate, hydrogen phosphate, phosphonate, nitrate, sulfate, nitrite, sulfite, perchlorate, tetrafluoroborate, hexafluorophosphate, or a mixture thereof, and the like. In some embodiments, the pH of the electrolyte may be maintained using a buffer. Typical buffers include salts of phosphate, borate, carbonate, silicate, trisaminomethane (Tris),4-(2-hydroxyethyl)-1-pipera-zineethanesulfonic acid (HEPES), piperazine-N,N'-bis(ethanesulfonic acid) (PIPES), and combinations thereof. These may be supplemented with an acid (e.g., HCl, $HNO_3$, $H_2SO_4$), or a base (e.g., NaOH, KOH, $NH_4OH$), and the like, for attaining a desired pH in a given electrolyte.

The intermediate neutralyte layer (NL) is similar to the separator layer in conventional batteries, and is comprised of a porous inert polymer or a ceramic membrane. Suitable polymers, for instance, include those chemically compatible with the supporting electrolytes of the presently described system, including high density polyethylene, polypropylene, polyvinylidene difluoride (PVDF), or poly-tetrafluoroethylene (PTFE). Porous ceramic membranes are chemically compatible oxides, nitrides, or carbides of various metals, e.g., $Al_2O_3$, $SiO_2$, $ZrO_2$, $TiO_2$, NiO, SiC, etc.

The negative and the positive electrodes are typically porous carbon felt or paper electrodes to provide large surface area, decorated, when needed, with catalytic materials so as to facilitate the redox reactions at either electrode. However, numerous other porous inert metal felts, e.g., Ti or Ni foam, can also be suitable materials for the negative and the positive electrodes/catalysts that can facilitate the desired electron transfer reactions by providing a large interfacial area as well as facile kinetics of electron transfer to and from the interface.

The Nernst cell equilibrium voltage $V_0$, a key determinant of cell energy storage efficiency, is determined by the difference in the Nernst electrode potentials of the posolyte and the negolyte redox couples. The careful selection of the redox couples determines the equilibrium cell voltage but also, reaction kinetics, number of electrons n involved in the electrode reactions, the chemical and oxygen stability of the electrolytes, cost, potential for water electrolysis, and their environmental benignity. There are, in fact, numerous possible choices, and their selection for a given application must be made carefully.

The posolyte redox molecule candidates should be soluble and stable in acidic electrolytes, and many potential choices are listed in Table I, while many negolyte candidates that are relatively soluble and stable in alkaline electrolytes are listed in Table II. Further, although organic redox molecules such as quinones have been widely investigated, including as sorbents for $CO_2$, transition metal-based compounds, which constitute the bulk of redox active materials, as listed in Tables 1 and 2, have not so far been utilized for this purpose, as proposed herein. FIGS. 7a and 7b show two different examples of such redox species in alkaline (FIG. 7a) and acidic (FIG. 7b) media.

Figure 7:
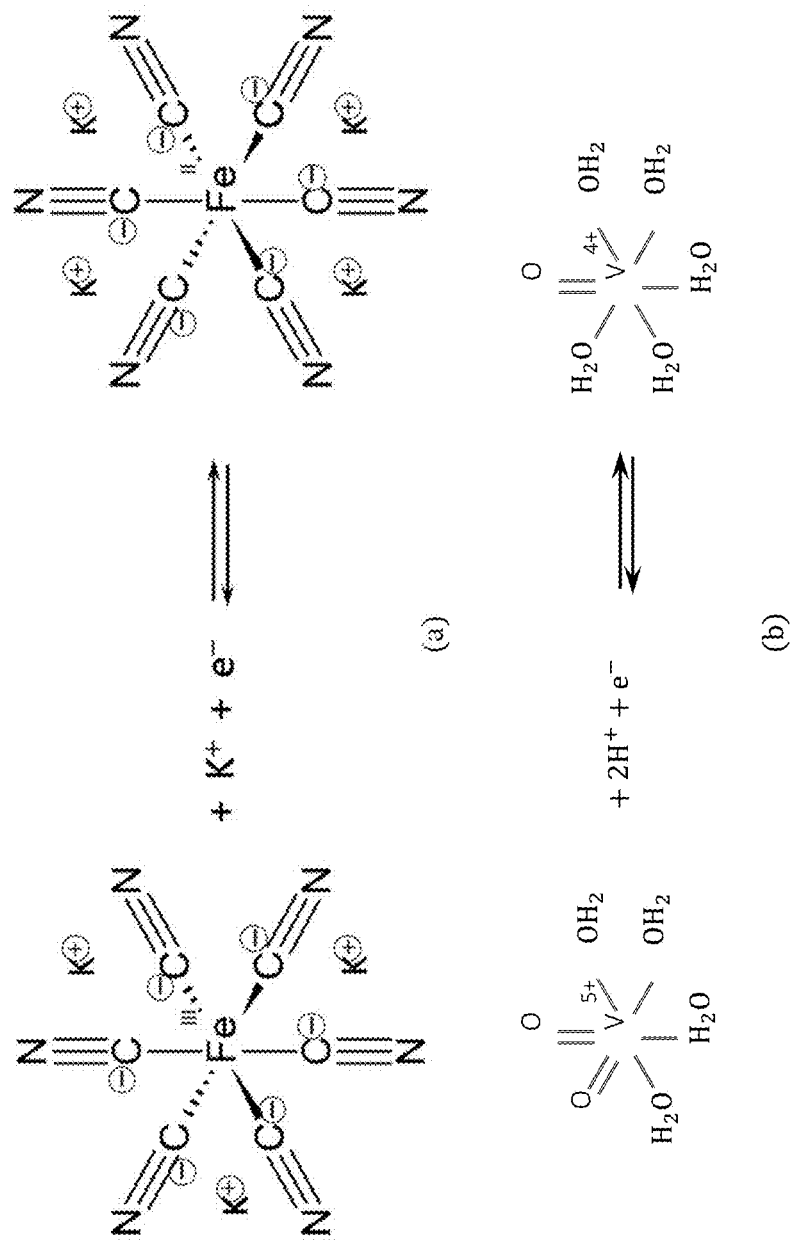
FIG. 7 shows examples of redox couples based on transition metal coordination compounds for (a) Aqua vanadium ions, $VO_2^+/VO^{2+}$, for the case of an acidic solution charge-transfer cation $A^+=H^+$, and (b) ferrocyanate in an alkaline solution with $A^+=K^+$ counterions.

The transition metal compounds such as those in FIG. 7, and listed in Tables 1 and 2, contain at their coordination center a multi-valent transition metal ion that can undergo a change in its oxidation state, $M^{(n+1)+}/M^{n+}$, e.g., $Fe^{3+/2+}$, or $Co^{3+/2+}$, surrounded by ligands, L, bound to it via lone pairs of electrons, along with counterions and exchangeable ions as cations $A^+$, e.g., $H^+$, or $K^+$, or anions $B^-$, e.g., $OH^-$, $Cl^-$, $HSO_4^-$, etc., to balance the change in the metal center oxidation state, as shown in FIG. 7. Polydentate ligands are especially useful for entropic stabilization of the chelate effect and avoiding the formation of transition metal hydroxides and hydrous oxides and leading to precipitation from basic electrolytes.

Many of the metal-ligand complexes, or coordination complexes, possess well-known molecular geometry, e.g., tetrahedral structure for a metal, e.g., Zn, with coordination number 4, and octahedral structure for a metal, e.g., V, with a coordination number 6. Thus, a central metal M is typically linked symmetrically to four or six ligands.

As an example, the $V^{5+/4+}$ complexes shown in FIG. 7(b) are octahedral aqua complexes of V bound to ligand $H_2O$ via O, along with $H^+$ as the exchangeable ions. On the other hand, FIG. 7a shows the $Fe^{3+/2+}$ coordination center with the bulkier cyanate ligands, and exchangeable $K^+$ ions. The advantage of bulkier ligands is that it reduces the chance of cross-over of the active material across the membrane. The tehtrahedral and octahedral cation structures together, in fact, form the Keggin structures in polyoxymetalates (POMs), including heteropolyacids (HPAs), which can be used as redox active materials in the cells described herein.

There are innumerable possibilities of the various transition metals with multiple oxidation states, which include Co, Cr, Sr, Cu, Fe, Mg, Mn, Mo, Ni, Pd, Pt, Ru, Sn, Ta, Ti, Zn, Zr, Nb, Mo, V, or a combination thereof. Many examples are included in Table I and Table II in acidic and basic aqueous solutions. Some of the compounds of interest are stable in both acidic and basic media, and provide the opportunity to use the same redox species in both the posolyte and in the negolyte. This is of particular interest when carbon capture is the main goal, as then the Nernst cell voltage reduces to reflect mainly the difference in pH and in the ionic strength of the electrolytes.

TABLE I

Standard Redox potentials in acid solutions (pH = 0) for typical electrode reactions.

| Electrode | Electrode Reaction | n | $\Phi_{0,298}^\circ$ (V vs. SHE) |
|---|---|---|---|
| $F^-/F_2$ | $2F^- \rightleftarrows F_2 + 2e^-$ | 2 | +2.866 |
| $Cu^{2+}/Cu^{3+}$ | $Cu^{2+} \rightleftarrows Cu^{3+} + e^-$ | 1 | +2.4 |
| $Co^{2+}/Co^{3+}$ | $Co^{2+} \rightleftarrows Co^{3+} + e^-$ | 1 | +1.82 |
| $Ag^+/Ag^{2+}$ | $Ag^+ \rightleftarrows Ag^{2+} + e^-$ | 1 | +1.8 |

TABLE I-continued

Standard Redox potentials in acid solutions (pH = 0) for typical electrode reactions.

| Electrode | Electrode Reaction | n | $\Phi_{0,298}^{\circ}$ (V vs. SHE) |
|---|---|---|---|
| $Ce^{3+}/Ce^{4+}$ | $Ce^{3+} \rightleftarrows Ce^{4+} + e^-$ | 1 | +1.72 |
| $PbSO_4/PbO_2$ | $PbSO_4 + 2H_2O \rightleftarrows PbO_2 + SO_4^{2-} + 4H^+ + 2e^-$ | 2 | +1.6913 |
| $Ce^{2+}/Ce^{3+}$ | $Ce^{2+} \rightleftarrows Ce^{3+} + e^-$ | 1 | +1.67 |
| $Mn^{2+}/Mn^{3+}$ | $Mn^{2+} \rightleftarrows Mn^{3+} + e^-$ | 1 | +1.5415 |
| $Mn^{2+}/MnO_4^-$ | $Mn^{2+} 4H_2O \rightleftarrows MnO_4^- + 8H^+ + 5e^-$ | 5 | +1.507 |
| $Pb^{2+}/PbO_2$ | $Pb^{2+} + 2H_2O \rightleftarrows PbO_2 + 4H^+ + 2e^-$ | 2 | +1.455 |
| $Cl^-/Cl_2$ | $2Cl^- \rightleftarrows Cl_2 + 2e^-$ | 2 | +1.3583 |
| $Cr^{3+}/Cr_2O_7^{2-}$ | $2Cr^{3+} + 7H_2O \rightleftarrows Cr_2O_7^{2-} + 4H^+ + 6e^-$ | 6 | +1.36 |
| $Cr^{4+}/Cr^{5+}$ | $Cr^{4+} \rightleftarrows Cr^{5+} + e^-$ | 1 | +1.34 |
| $Tl^+/Tl^{3+}$ | $Tl^+ \rightleftarrows Tl^{3+} + 2e^-$ | 2 | +1.252 |
| $O_2/H_2O$ | $2H_2O \rightleftarrows O_2 + 4H^+ + 4e^-$ | 4 | +1.229 |
| $Br^-/Br_2$ | $2Br^- \rightleftarrows Br_2 + 2e^-$ | 2 | +1.0873 |
| $TeO_2/H_6TeO_6$ | $TeO_2 + 4H_2O \rightleftarrows H_6TeO_6 + 2H^+ + 2e^-$ | 2 | +1.02 |
| $VO^{2+}/VO_2^+$ | $VO^{2+} + H_2O \rightleftarrows VO_2^+ + 2H^+ + e^-$ | 1 | +1.004 |
| $Ru(CN)_6^{4-}/Ru(CN)_6^{3-}$ | $Ru(CN)_6^{4-} \rightleftarrows Ru(CN)_6^{3-} + e^-$ | 1 | +0.86 |
| $Fe(bipy)_2^{2+}/Fe(bipy)_2^{3+}$ | $Fe(bipy)_2^{2+} \rightleftarrows Fe(bipy)_2^{3+} \; e^-$ | 1 | +0.78 |
| $Fe^{2+}/Fe^{3+}$ | $Fe^{2+} \rightleftarrows Fe^{3+} + e^-$ | 1 | +0.771 |
| $H_2Q/Q$ | $H_2Q \rightleftarrows Q + 2H^+ + 2e^-$ |  | +0.6992 |
| $O_2/H_2O_2$ | $H_2O_2 \rightleftarrows O_2 + 2H^+ + 2e^-$ | 2 | +0.682 |
| $I^-/I_2$ | $2I^- \rightleftarrows I_2 + 2e^-$ | 2 | +0.536 |
| Ferrocene/Ferrocinium$^+$ | Ferrocene $\rightleftarrows$ Ferrocinium$^+$ + $e^-$ | 1 | +0.400 |
| $Fe(CN)_6^{4-}/Fe(CN)_6^{3-}$ | $Fe(CN)_6^{4-} \rightleftarrows Fe(CN)_6^{3-} + e^-$ | 1 | +0.358 |
| $Hg/Hg_2Cl_2$ | $2Hg + 2Cl^- \rightleftarrows Hg_2Cl_2 + 2e^-$ | 2 | +0.2681 |
| Calomel Electrode | Calomel Electrode, Saturated KCl |  | +0.2412 |
| Ag/AgCl | $Ag + Cl^- \rightleftarrows AgCl + e^-$ | 1 | +0.2223 |
| $Ag_4Fe(CN)_6/Fe(CN)_6^{3-}$ | $4Ag + Fe(CN)_6^{4-} \rightleftarrows Ag_4Fe(CN)_6 + 4e^-$ | 4 | +0.1478 |
| $Ru(NH_3)_6^{2+}/Ru(NH_3)_6^{3+}$ | $Ru(NH_3)_6^{2+} \rightleftarrows Ru(NH_3)_6^{3+} + e^-$ | 1 | +0.10 |
| Ag/AgBr | $Ag + Br^- \rightleftarrows AgBr + e^-$ | 1 | +0.0713 |
| $H_2/H^+$ | $H_2 \rightleftarrows 2H^+ + 2e^-$ | 2 | 0.0000 |
| $Ti^{3+}/Ti(OH)^{3+}$ | $Ti^{3+} + H_2O \rightleftarrows Ti(OH)^{3+} + H^+ + e^-$ | 1 | −0.055 |
| $Pb/Pb^{2+}$ | $Pb \rightleftarrows Pb^{2+} + 2e^-$ | 2 | −0.1262 |
| $In/In^+$ | $In \rightleftarrows In^+ + e^-$ | 1 | −0.14 |
| Ag/AgI | $Ag + I^- \rightleftarrows AgI + e^-$ | 1 | −0.1522 |
| HCOOH | $HCOOH \rightleftarrows CO_2 + 2H^+ + 2e^-$ | 2 | −0.199 |
| $Ga/Ga^+$ | $Ga \rightleftarrows Ga^+ + e^-$ | 1 | −0.2 |
| $V^{2+}/V^{3+}$ | $V^{2+} \rightleftarrows V^{3+} + e^-$ | 1 | −0.26 |
| $In/In^{3+}$ | $In \rightleftarrows In^{3+} + 3e^-$ | 3 | −0.3382 |
| $PbSO_4/PbO_2$ | $Pb + SO_4^{2-} \rightleftarrows PbSO_4 + 2e^-$ | 2 | −0.3588 |
| $Cr^{2+}/Cr^{3+}$ | $Cr^{2+} \rightleftarrows Cr^{3+} + e^-$ | 1 | −0.407 |
| $Fe/Fe^{2+}$ | $Fe \rightleftarrows Fe^{2+} + 2e^-$ | 2 | −0.447 |
| $Ti^{2+}/TiO_2$ | $Ti^{2+} + 2H_2O \rightleftarrows TiO_2 + 4H^+ + 2e^-$ | 2 | −0.502 |
| $Ga/Ga^{3+}$ | $Ga \rightleftarrows Ga^{3+} + 3e^-$ | 3 | −0.549 |
| $Zn/Zn^{2+}$ | $Zn \rightleftarrows Zn^{2+} + 2e^-$ | 2 | −0.7618 |
| $H_2Te/Te$ | $H_2Te \rightleftarrows Te + 2H^+ + 2e^-$ | 2 | −0.793 |
| $Ti^{2+}/Ti^{3+}$ | $Ti^{2+} \rightleftarrows Ti^{3+} + e^-$ | 1 | −0.9 |
| $Ti/Ti^{3+}$ | $Ti \rightleftarrows Ti^{3+} + 3e^-$ | 3 | −1.37 |
| $Al/Al^{3+}$ | $Al \rightleftarrows Al^{3+} + 3e^-$ | 3 | −1.662 |
| $Na/Na^+$ | $Na \rightleftarrows Na^+ + e^-$ | 1 | −2.71 |
| $K/K^+$ | $K \rightleftarrows K^+ + e^-$ | 1 | −2.931 |
| $Li/Li^+$ | $Li \rightleftarrows Li^+ + e^-$ | 1 | −3.0401 |

TABLE II

Standard Redox potentials in basic solutions (pH = 14) for typical electrode reactions

| Electrode | Electrode Reaction | n | $\Phi_{0, 298}^{\circ}$ (V vs. SHE) |
|---|---|---|---|
| $FeO_2^-/FeO_4^{2-}$ | $FeO_2^- + 4OH^- \rightleftarrows FeO_4^{2-} + 2H_2O + 3e^-$ | 3 | +0.9 |
| $AgO/Ag_2O_3$ | $2AgO + 2OH^- \rightleftarrows Ag_2O_3 + H_2O + 2e^-$ | 2 | +0.739 |
| $Ag_2O/AgO$ | $Ag_2O + 2OH^- \rightleftarrows 2AgO + H_2O + 2e^-$ | 2 | +0.607 |
| $MnO_2/MnO_4^-$ | $MnO_2 + 4OH^- \rightleftarrows MnO_4^- + 2H_2O + 2e^-$ | 2 | +0.60 |
| $Ni(OH)_2/Ni(OOH)$ | $Ni(OH)_2 + OH^- \rightleftarrows Ni(OOH) + H_2O + e^-$ | 1 | +0.49 |
| $Fe(CN)_6^{4-}/Fe(CN)_6^{3-}$ | $Fe(CN)_6^{4-} \rightleftarrows Fe(CN)_6^{3-} + e^-$ | 1 | +0.49 |
| $4OH^-/O_2$ | $4OH^- \rightleftarrows O_2 + 2H_2O + 4e^-$ | 4 | +0.401 |
| $Ag/Ag_2O$ | $2Ag + 2OH^- \rightleftarrows Ag_2O + H_2O + 2e^-$ | 2 | +0.344 |
| $PbO/PbO_2$ | $PbO + 2OH^- \rightleftarrows PbO_2 + H_2O + 2e^-$ | 2 | +0.248 |
| $Co(OH)_2/Co(OH)_3$ | $Co(OH)_2 + OH^- \rightleftarrows Co(OH)_3 + e^-$ | 1 | +0.17 |
| $Pt/Pt(OH)_2$ | $Pt + 2OH^- \rightleftarrows Pt(OH)_2 + 2e^-$ | 2 | +0.14 |
| $Mn(OH)_2/Mn(OH)_3$ | $Mn(OH)_2 + OH^- \rightleftarrows Mn(OH)_3 + e^-$ | 1 | +0.15 |
| $Co(NH_3)_6^{2+}/Co(NH_3)_6^{3+}$ | $Co(NH_3)_6^{2+} \rightleftarrows Co(NH_3)_6^{3+} + e^-$ | 1 | +0.108 |
| $NH_3OH/N_2H_4$ | $2NH_3OH + 2OH^- \rightleftarrows N_2H_4 + 4H_2O + 2e^-$ | 2 | +0.1 |
| $Mn(OH)_2/MnO_2$ | $Mn(OH)_2 + 2OH^- \rightleftarrows MnO_2 + H_2O + 2e^-$ | 2 | -0.05 |
| $Tl(OH)/Tl(OH)_3$ | $Tl(OH) + 2OH^- \rightleftarrows Tl(OH)_3 + 2e^-$ | 2 | -0.05 |
| $Cu_2O/Cu(OH)_2$ | $Cu_2O + 2OH^- + H_2O \rightleftarrows 2Cu(OH)_2 + 2e^-$ | 2 | -0.08 |
| $Cr(OH)_3/CrO_4^{2-}$ | $Cr(OH)_3 + 5OH^- \rightleftarrows CO_4^{2-} + 4H_2O + 3e^-$ | 3 | -0.13 |
| $Tl/TlOH$ | $Tl + OH^- \rightleftarrows TlOH + e^-$ | 1 | -0.34 |
| $Cu/Cu_2O$ | $2Cu + 2OH^- \rightleftarrows Cu_2O + H_2O + 2e^-$ | 2 | -0.360 |
| $Bi/Bi_2O_3$ | $2Bi + 6OH^- \rightleftarrows Bi_2O_3 + 3H_2O + 6e^-$ | 6 | -0.46 |
| $Ni(OH)_2/NiO_2$ | $Ni(OH)_2 + 2OH^- \rightleftarrows NiO_2 + 2H_2O + 2e^-$ | 2 | -0.49 |
| $Fe(OH)_2/Fe(OH)_3$ | $Fe(OH)_2 + OH^- \rightleftarrows Fe(OH)_3 + e^-$ | 1 | -0.56 |
| $Cd/Cd(OH)_4^{2-}$ | $Cd + 4OH^- \rightleftarrows Cd(OH)_4^{2-} + 2e^-$ | 2 | -0.658 |
| $Ni/Ni(OH)_2$ | $Ni + 2OH^- \rightleftarrows Ni(OH)_2 + 2e^-$ | 2 | -0.72 |
| $Co/Co(OH)_2$ | $Co + 2OH^- \rightleftarrows Co(OH)_2 + 2e^-$ | 2 | -0.73 |
| $Cd/Cd(OH)_2$ | $Cd + 2OH^- \rightleftarrows Cd(OH)_2 + 2e^-$ | 2 | -0.81 |
| $H_2/H_2O$ | $H_2 + 2OH^- \rightleftarrows 2H_2O + 2e^-$ | 2 | -0.822 |
| $In/In(OH)_4^-$ | $In + 4OH^- \rightleftarrows In(OH)_4^- + 3e^-$ | 3 | -1.099 |
| $Zn/Zn(OH)_4^{2-}$ | $Zn + 4OH^- \rightleftarrows Zn(OH)_4^{2-} + 2e^-$ | 2 | -1.199 |
| $Ga/H_2GaO_3^-$ | $Ga + 4OH^- \rightleftarrows H_2GaO_3^- + H_2O + 3e^-$ | 3 | -1.219 |
| $Al/Al(OH)_3$ | $Al + 3OH^- \rightleftarrows Al(OH)_3 + 3e^-$ | 3 | -2.31 |
| $Mg/Mg(OH)_2$ | $Mg + 2OH^- \rightleftarrows Mg(OH)_2 + 2e^-$ | 2 | -2.690 |

While Tables 1 and 2 list many possible redox couple combinations, it is obvious that there are many other possibilities, including organic, inorganic, and organometallic species. It is to be further noted that for the values reported in Table II at the high pH, the effect of pH is already included.

Examples of various cell configurations along with some redox couples are provided below. While, as indicated below, some of the following exemplary cell configurations have been used before for the purpose of energy storage, none have been used for the purpose of carbon capture alone or for the purpose of combined carbon capture and energy storage.

Example System Configurations

Given the wide variety of component material choices, combined with the four different ⊖-IEM1-NL-IEM2-⊕) arrangements, namely: a) ⊖-AEM-NL-CEM-⊕, b) ⊖-CEM-NL-AEM-⊕, c) ⊖-CEM1-NL-CEM2-⊕, and d) ⊖-AEM1-NL-AEM2-⊕, a very large number of implementation schemes are possible. Further, there are the following four different ions potentially available for charge transfer, namely, the two cations, $H^+$ (posolyte) and $A^+$ (negolyte), and the two anions, $OH^-$ and $X^-$ (posolyte), the ions $A^+$ (negolyte) and $X^-$ (posolyte) resulting from the supporting electrolytes. In addition, when carbon capture is involved in alkaline electrolytes, there are two additional anions, $HCO_3^-$ and $CO_3^{2-}$ in the negolyte.

For instance, ignoring the $CO_2$ bearing anions, for the case of a cell based on an AEM and a CEM arrangement, the following choices are possible for the charge transfer ions: 1) $H^+$ and $OH^-$; 2) $H^+$ and $X^-$; 3) $A^+$ and $OH^-$; and 4) $A^+$ and $X^-$. For the case of two CEMs or two AEMs as the ion-exchange membranes, the possible choices are: 5) $X^-$ and $OH^-$; and 6) $H^+$ and $A^+$. In other words, the choice of the membranes as well as that for the ions for charge transfer between the electrodes determines the chemistry at the electrodes and the arrangements for material flow. The choice of the redox couples and their concentrations at either electrode depend upon the goal, i.e., whether it is exclusively carbon capture or energy storage, or whether the goal is to couple carbon capture with energy storage.

The above-mentioned details need to be carefully considered from an efficiency and materials perspective in cell design for a given application. Only a few exemplary arrangements are described below. It should be evident that many other configurations may be apparent within the scope of the claimed approach.

Figure 8:
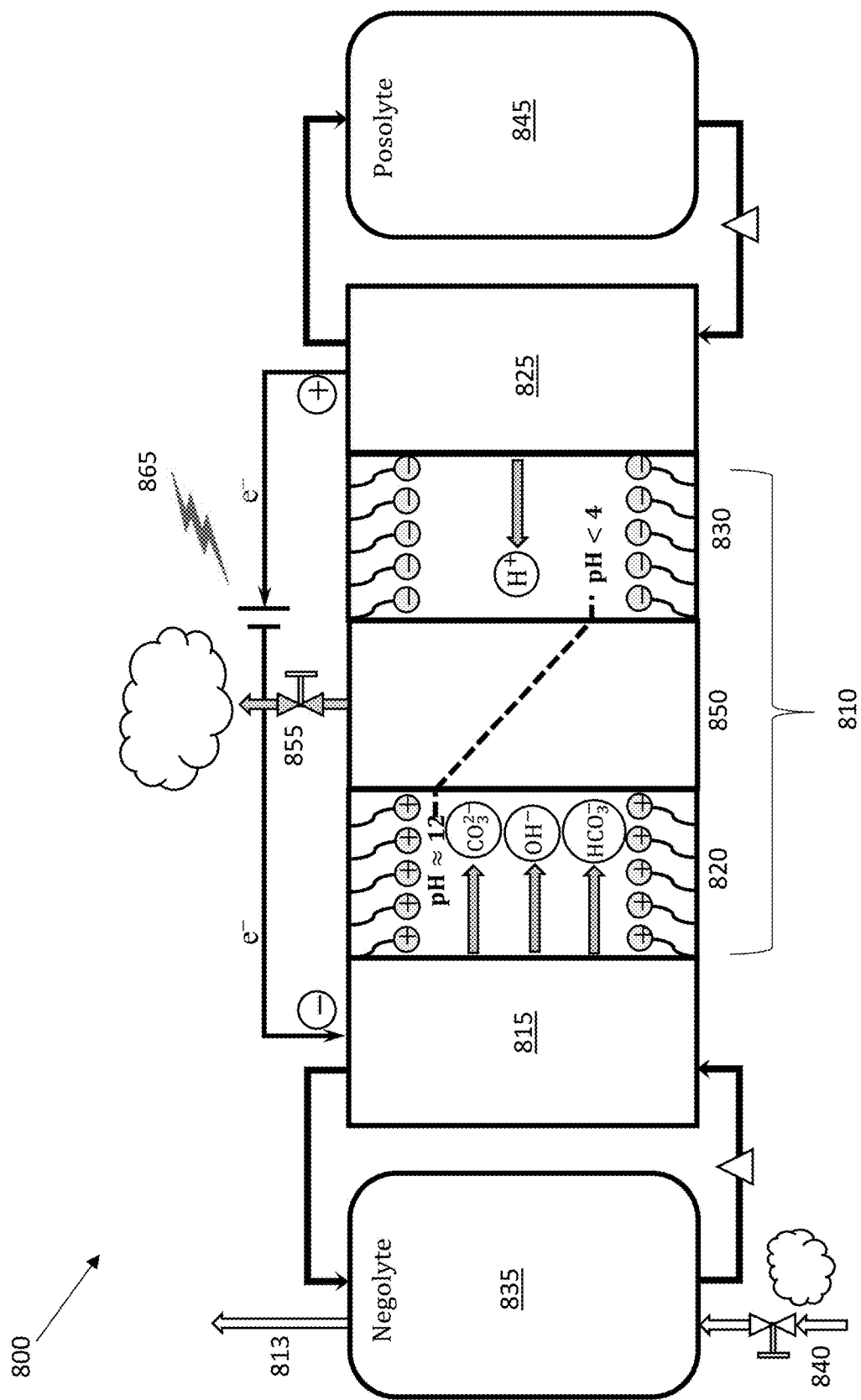
FIG. 8 is an example schematic of an embodiment of a CC-RFB cell.

1) An ⊖-AEM-NL-CEM-⊕ arrangement: FIG. 8 provides a schematic of an exemplary system 800 with an AEM-NL-CEM membrane arrangement 810. The NL 850 is flanked by a negative electrode 815 adjacent to the AEM 820 and a positive electrode 825 in contact with the CEM 830 (separate chambers such as alkaline negolyte chamber 135 and acidic posolyte chamber 140 shown in FIG. 1 are not shown for simplicity).

A negolyte tank 835 is fed with CO$_2$ via inlet 840 from a CO$_2$ source such as flue gas or ambient air. Cleansed exhaust leaves the negolyte tank 835 via outlet 813. Acidic posolyte is contained in posolyte tank 845. Pure CO$_2$ exits the AEM-NL-CEM membrane arrangement 810 along exhaust 855. Load 865 is electrically connected to AEM-NL-CEM membrane arrangement 810.

The system 800 also includes CO$_2$ absorption in the alkaline negolyte, contained in tank 835. The absorption operates according to:

$$OH^- + CO_2 \rightleftharpoons HCO_3^-$$
$$OH^- + HCO_3^- \rightleftharpoons CO_3^{2-} + H_2O.$$

The system 800 in FIG. 8 features a generic R_/O_ couple at the negative electrode 815 (denoted by the subscript "—") dissolved in an aqueous alkaline (A$^+$OH$^-$) supporting electrolyte called "negolyte," and another R$_+$/O$_+$ couple at the positive electrode 825 (denoted by the subscript "+") dissolved in an aqueous acidic (H$^+$X$^-$) supporting electrolyte called "posolyte."

The CO$_2$ source is directly contacted with the negolyte at a high pH to capture the CO$_2$ as bicarbonate and carbonate ions, and the resulting solution is pumped to the negative electrode 815, while posolyte from posolyte tank 845 is pumped to the positive electrode 825.

At the negative electrode 815, in the carbon-capture/charging phase, the oxidant molecule in the negolyte is reduced while restoring alkalinity via concomitant generation of the hydroxyl ions, and the reductant in the posolyte is oxidized at the positive electrode, generating protons, and hence acidity, to sustain the pH differential across the NL 850, where CO$_2$ is released. For example, the pH in the negolyte can be around 12 while the pH in the posolyte can be less than 4.

The $\rho^{th}$ reaction steps in layer/(labeled $s_{l,\rho}$) that occur in the different layers of the cell are also listed below for generic redox couples and choice of H$^+$ and OH$^-$ as the key (in addition to HCO$_3^-$ and CO$_3^{2-}$ charge transfer ions via the membranes:

| Component | | Reaction |
|---|---|---|
| Cathode, | $s_{-, 1}$: | $O_- + AOH + e^- \rightleftharpoons R_- + OH^-$ |
| Contactor, | $s_{C, 1}$: | $OH^- + CO_2 \rightleftharpoons HCO_3^-$ |
| NL, | $s_{C, 2}$: | $OH^- + HCO_3^- \rightleftharpoons CO_3^{2-} + H_2O$ |
| | $s_{NL, 1}$: | $H^+ + CO_3^{2-} \rightleftharpoons HCO_3^-$ |
| | $s_{NL, 2}$: | $H^+ + HCO_3^- \rightleftharpoons H_2O + CO_2$ |
| | $s_{NL, 3}$: | $H^+ + OH^- \rightleftharpoons H_2O$ |
| Anode, | $s_{+, 1}$: | $R_+ \rightleftharpoons O_+ + H^+ + e^-$ |
| Cell OR: | | $O_- + AOH + R_+ \rightleftharpoons R_- + H_2O + O_+$ |
| CO$_2$ Capture: | | $CO_{2,f} \rightleftharpoons CO_{2,p}$ |

Thus, the anions in the negolyte, namely, OH$^-$, HCO$_3^-$, and CO$_3^{2-}$ migrate directly via the AEM 820 to arrive at the NL 850 (from the electrode compartment), while the protons formed at the positive electrode 825 migrate across the CEM 830 to arrive at the NL 850, where they combine with the anions as described in above reactions, releasing pure CO$_2$ along exhaust 855 that is suitable for storage or for further processing.

As an exemplary system, we consider R_/O_=[Fe$^{II}$(CN)$_6$]$^{4-}$/[Fe$^{III}$(CN)$_6$]$^{3-}$, the ferro-/ferri-cyanate couple, and R$_+$/O$_+$=QH$_2$/Q, the hydroquinone/quinone couple. Further, for the supporting electrolytes, we assume A$^+$OH$^-$=K$^+$ OH$^-$ in the negolyte, and H$^+$X$^-$=H$^+$Cl$^-$ in the posolyte. Then, the electrode reaction steps are $$Neg: K_3^+[Fe^{III}(CN)_6]^{3-} + K^+OH^- + e^- \rightleftharpoons K_4^+[Fe^{II}(CN)_6]^{4-} + OH^-;$$
$$(\Phi_{-,0}^o)_{pH=0} = +0.358 \text{ V}$$
$$Pos: H_2Q \rightleftharpoons Q + 2H^+ + 2e^-; \quad (\Phi_{+,0}^o)_{pH=0} = +0.6992 \text{ V}$$

The standard electrode potentials in the above are taken from Tables 1 and 2. It may be noted from these tables that the ferri/ferro-cyanate couple is feasible in both acidic and alkaline media, and consequently, the value of standard potential $\Phi_{-,0}^o$ above is taken at unit activity of protons (low pH), or highly acidic systems. The potential reported for the alkaline media in Table 2 already includes the effect of higher pH.

As a result, the overall cell reaction during the charging/carbon capture (reverse arrow, ←) phase for the above system is $$H_2Q + 2K_3^+[Fe^{III}(CN)_6]^{3-} + 2KOH \rightleftharpoons Q + 2K_4^+[Fe^{II}(CN)_6]^{4-} + 2H_2O;$$
$$(V_0^o)_{pH=0} = 0.3412 \text{ V}$$

The overall cell Nernst potential, with the mass action term in terms of the state-of-charge (soc) of the electrolytes, $$\overleftarrow{V}_0 = (V_0^o)_{pH=0} + \frac{RT}{nF}\ln\left(\frac{soc}{1-soc}\right)^2 +$$
$$\left(\frac{RT}{n_{CC}F}\right)\ln\left(\frac{p_{CO_2,p}}{p_{CO_2,f}}\right) + 2.3026\left(\frac{RT}{F}\right)(pH_- - 2pH_+)$$

i.e., besides the standard cell potential of the chosen couples, $(V_0^o)_{pH=0}$, it is also strongly affected by the state-of-charge of the electrolytes, the desired CO$_2$ purification (here $p_{CO_{2,-}}$ is the partial pressure of CO$_2$ in the source and $p_{CO_{2,+}}$ is that in the captured stream), and the pH differential.

As an example, for this system for soc=0.5, capture of pure CO$_2$ ($p_{CO_{2,p}}$=1 atm.) directly from air ($p_{CO_{2,f}}$=0.00041 atm.), the Nernst potential of the cell, and pH$_-$=12 and pH$_+$=1, and $n_{CC}$=1.47.

$$\overleftarrow{V}_0 = 0.3412 + \left(\frac{8.314 \times 298}{2 \times 96,485}\right)\ln\left(\frac{0.5}{0.5}\right)^2 +$$
$$\left(\frac{8.314 \times 298}{1.47 \times 96,485}\right)\ln\left(\frac{1}{0.00041}\right) + 2.3026\left(\frac{8.314 \times 298}{96,485}\right)(12 - 2 \times 1) = 1.07 \text{ V}$$

Consequently, in the absence of any irreversibilities, or overpotentials, the theoretical maximum, or thermodynamic, efficiency of such a cell used exclusively for carbon capture, with $\overleftarrow{V} = \overleftarrow{V}_0$ $$\varepsilon_{CC,0} = \frac{V_{0,CC}}{\overleftarrow{V}_0} = \frac{0.1362}{1.07} = 12.7\%$$

This efficiency can be improved further by: 1) selecting the redox couple to further reduce $(V_0^o)_{pH=0}$; 2) minimizing the pH differential as necessary for $CO_2$ capture; and 3) operating at a low current density to minimize the overpotentials, although these are not accounted for in the above maximum theoretical efficiency.

One method of improving the carbon capture efficiency is to use a redox couple with a negative standard voltage, i.e., $(V_0^o)_{pH=0}<0$. This might be illustrated simply by using the redox couples of the last example, but switching their polarity. In other words, if the ferro-/ferri-cyanate couple was used in the posolyte, i.e., $R_+/O_+=[Fe^{II}(CN)_6]^{4-}/[Fe^{III}(CN)_6]^{3-}$, and the hydroquinone/quinone couple in the negolyte, i.e., $R_-/O_-=QH_2/Q$, then $(V_0^o)_{pH=0}=(\Phi_{+,0}^o)_{pH=0}-(\Phi_{-,0}^o)_{pH=0}=+0.358-(+0.6992)=-0.3412$. Then, from the preceding calculation, $$\vec{V}_0 = -0.3412 + \left(\frac{8.314\times298}{2\times96,485}\right)\ln\left(\frac{0.5}{0.5}\right)^2 + \left(\frac{8.314\times298}{1.47\times96,485}\right)\ln\left(\frac{1}{0.00041}\right) +$$

$$2.3026\left(\frac{8.314\times298}{96,485}\right)(12-1) = 0.4454 \text{ V}$$

Thus, the theoretical maximum, or thermodynamic, efficiency of the cell $$\epsilon_{CC,0} = \frac{V_{0,CC}}{\vec{V}_0} = \frac{0.1362}{0.4454} = 30.6\%$$

representing a dramatic improvement. It turns out that in the cited example, this is indeed feasible, since the hydroquinone/quinone couple is stable in alkaline conditions, and can be used, while the ferro/ferri-cyanate couple can also be employed under acidic conditions.

The cell Nernst potential is also affected by the soc. However, the soc changes with time for limited amounts of electrolyte. Once exhausted, the two redox couples at either electrode are either replenished chemically or regenerated electrochemically, e.g., by operating the cell cyclically in the reverse, when, depending upon whether the Nernst voltage is adequate to overcome the overpotentials, useful power is produced, which would further enhance the energy efficiency of the process. In fact, combined energy storage and carbon capture is the preferred manner of operation.

During such a discharge cycle (forward arrow, →) for the cell, since $CO_2$ is not involved, the reactions that occur are

| Component | | Reaction |
|---|---|---|
| Anode, | $s_{-, 1}$: | $R_- + OH^- \rightleftarrows O_- + AOH + e^-$ |
| NL, | $S_{NL, 1}$: | $H_2O \rightleftarrows H^+ + OH^-$ |
| Cathode, | $s_{+, 1}$: | $O_+ + H^+ + e^- \rightleftarrows R_+$ |
| Cell OR: | | $R_- + H_2O + O_+ \rightleftarrows O_- + AOH + R_+$ |

Thus, the Nernst cell potential reduces to $$\vec{V}_0 = \vec{V}_0 + V_{0,CC}$$

Water ionization, during reverse bias occurs in the NL to supply protons to the positive electrode and hydroxyl ions to the negative electrode, in order to maintain the pH differential, i.e., $$H_2O \rightleftarrows H^+(aq) + OH^-(aq)$$

The thermodynamic barrier for this reaction, $\Delta G_r^o = G_{H^+(aq)}^o + G_{OH^-(aq)}^o - G_{f,H_2O(l)}^o = 0 + (-157.3) - (-237.2) = +79.9$ kJ mol$^{-1}$=–RT ln $K_w$, is already included in the $V_{\Delta pH}$ term.

$$V_{\Delta pH} = 2.3026\left(\frac{RT}{F}\right)(pH_- - pH_+) = \frac{\Delta G_r^o}{nF} = 0.828 \text{ V}$$

However, additionally, there is significant kinetic overpotential for the water dissociation reaction. Thus, the water dissociation rate constant is small, $\vec{k}_w=2.5\times10^{-5}$ s$^{-1}$, along with an activation energy, $\vec{E}_w=65–70$ kJ mol$^{-1}$. This can be alleviated by incorporating a catalyst, or a salt, in the NL. For the forward bias, or for charging phase, the reaction in the NL 850 is the reverse, i.e., a combination of the protons and the hydroxyl ions, which is an instantaneous reaction, since, $\overleftarrow{k}_w/\vec{k}_w=K_w\approx1\times10^{-14}$. Thus, the resulting polarization behavior because of the unidirectional flux in the current-voltage plot is akin to the rectifying behavior in a diode with a p-n junction, wherein the current is rectified until a breakdown voltage is reached. This irreversibility makes the ⊖-AEM-NL-CEM-⊕ arrangement described in FIG. 8 less efficient for combined carbon capture and energy storage. This issue also plagues bipolar membranes. More efficient arrangements are described below.

Figure 9B:
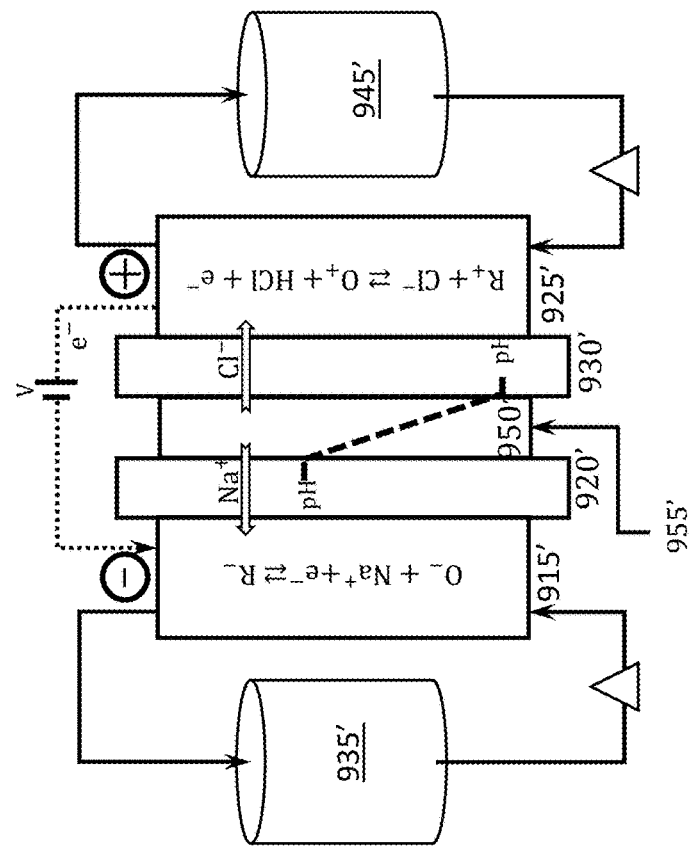
FIGS. 9a and 9b are example schematics of an embodiment of a CC-RFB cell.
Figure 9A:
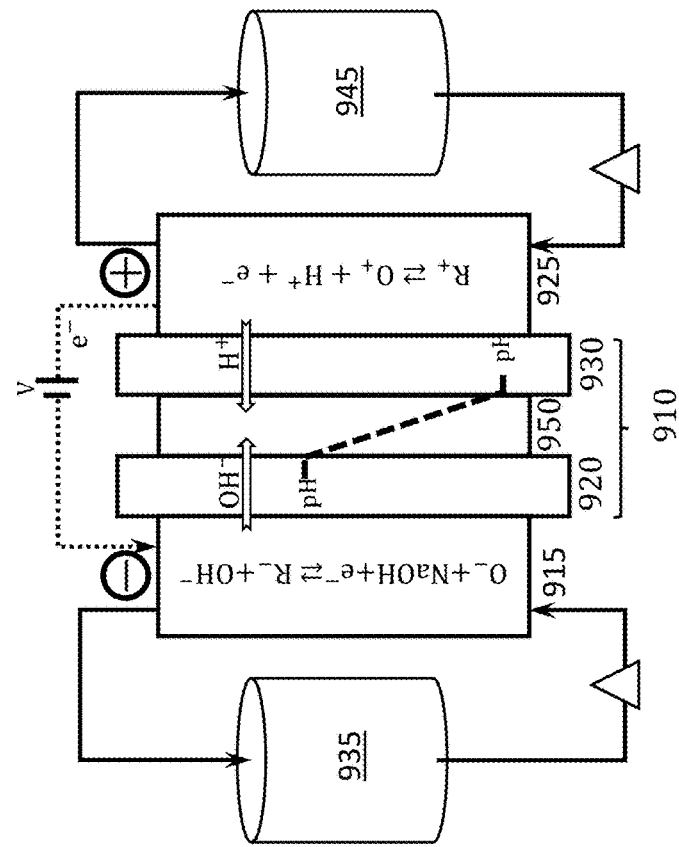

2) A ⊖-CEM-NL-AEM-⊕ arrangement: FIG. 9a shows a system 900 with a ⊖-AEM-NL-CEM-⊕ arrangement and FIG. 9b shows a system 900' with a ⊖-CEM-NL-AEM-⊕ structure for a RFB in the charge mode. The reactions in the respective NL 950, 950' are facile reactions.

In FIG. 9a, the NL 950 has a reaction that is $H^+ + OH^- \rightleftarrows H_2O$ with the AEM 920 next to the negative electrode 915 and a CEM 930 next to the positive electrode 925. Accordingly, the configuration is an AEM-NL-CEM membrane arrangement 910.

The NL 950' in FIG. 9b has a salt ionization reaction, e.g., NaCl $\rightleftarrows$ Na$^+$+Cl$^-$ with the CEM 920' next to the negative electrode 915' and an AEM 930' next to the positive electrode 925'. NaCl electrolyte source 955' is directed to the NL 950'

During the discharge phase the reactions are simply the reverse, e.g., water ionization $H_2O \rightleftarrows H^+ + OH^-$, and salt ion association, Na$^+$+2 Cl$^- \rightleftarrows$ $^2$NaCl. While the latter is still facile, the former is energetically forbidding.

One chemical system using these systems uses an alkaline [Zn(OH)$_4$]$^{2-}$/Zn redox couple in a NaOH solution as the negolyte, and replaces the posolyte redox couple with a Fe$^{2+}$/Fe$^{3+}$ couple in an HCl solution, with a lower potential, $\Phi_{+,0}^o=+0.77$ V to avoid oxygen evolution, with the resulting cell Nernst potential, $V_0^o=\Phi_{+,0}^o-\Phi_{-,0}^o=+0.77-(-1.22)=1.99$ V. The electrode reactions during discharge mode are

| Component | Reaction |
|---|---|
| −ve Electrode: | Zn + 4(Na$^+$OH$^-$) $\rightleftarrows$ Na$_2^+$[Zn(OH)$_4$]$^{2-}$ + 2Na$^+$ + 2e$^-$ |
| Neutralyte: | 2Na$^+$ + 2Cl$^- \rightleftarrows$ 2NaCl |

| Component | Reaction |
|---|---|
| +ve Electrode: | $2H^+[Fe^{3+}Cl_4^-] + 2(H^+Cl^-) + 2e^- \rightleftarrows 2H_2^+[Fe^{2+}Cl_4^-] + 2Cl^-$ |
| Cell: | $Zn + 4(Na^+OH^-) + 2H^+[Fe^{3+}Cl_4^-] \rightleftarrows Na_2^+[Zn(OH)_4]^{2-} + 2H_2^+[Fe^{2+}Cl_4^-] + 2NaCl$ |

This promising chemistry may be more successfully implemented in a cell design with two CEMs, as proposed next, more so when combined with carbon capture.

3) A ⊖-CEM1-NL-CEM2-⊕ arrangement: Another example that is especially attractive for carbon capture coupled with energy storage is the system 1000 shown in FIG. 10.

A negolyte tank 1035 is fed with $CO_2$ via inlet 1040 from a $CO_2$ source such as flue gas or ambient air. Cleansed exhaust leaves the negolyte tank 1035 via outlet 1013. Acidic posolyte is contained in posolyte tank 1045. Pure $CO_2$ exits the NL 1050 along exhaust 1055. Load 1065 is electrically connected to the AEM-NL-CEM membrane arrangement 1010.

This system 1000 differs from the examples above in that both the ion-exchange membranes are CEMs, so that the charge transfer ions are the alkali metal cation $A^+$ in CEM1 1020 and the proton $H^+$ in CEM2 1030. Such a schematic structure has not been proposed before for the purpose of either energy storage or in combination with carbon capture.

It can be especially advantageous to use both membranes as CEMs, since AEMs are not yet as well developed technologically or commercially, and possess considerably lower conductivity. Further, there are issues with mechanical and chemical robustness. They are also not able to effectively preclude the leakage of counterions ($Na^+/H^+$) through them. Another attractive feature of the twin-CEM scheme shown in FIG. 10 is that for energy storage the energetically demanding water dissociation reaction is not involved in the NL 1050.

Because of the absence of an AEM next to the negative electrode 1015, the $OH^-$ ion that restores alkalinity in the negolyte, as well as the $HCO_3$ and $CO_3^{2-}$ ions formed in the $CO_2$-negolyte contactor, cannot make their way to the NL 1050 directly via migration through the membrane (the CEM1 1020). As a result, a part of the negolyte (from negolyte tank 1035) must be pumped into the NL 1050, e.g., via pumping mechanism 1065 as well as to be in communication with the negative electrode 1015. The cations $A^+$ also accompany the bicarbonate, carbonate, and hydroxyl anions to the NL 1050, along with the redox ($R_-/O_-$) species. The cations $A^+$ are, however, returned from the NL 1050 to the negative electrode 1015 via ionic migration through the CEM1 1020. The protons formed in the reaction at the positive electrode 1025 and streaming into the NL 1050 via CEM2 1030 reduce the negolyte pH there, resulting in the evolution of $CO_2$. The acidified negolyte issuing from the NL 1050 is mixed with the negolyte exiting from the negative electrode 1015, where its alkalinity has been restored via formation of the hydroxyl ions, and the mixture is thereupon returned to the tank 1035 (which is a storage vessel/contactor) for additional $CO_2$ capture. Intake air enters the system 1000 from $CO_2$ source 1040 (e.g., ambient air) and pure $CO_2$ released along exhaust 1055 that is suitable for storage or for further processing. In some embodiments, the pH at one side of the NL 1050 is around 12 and less than around 2 at the other side.

Figure 10:
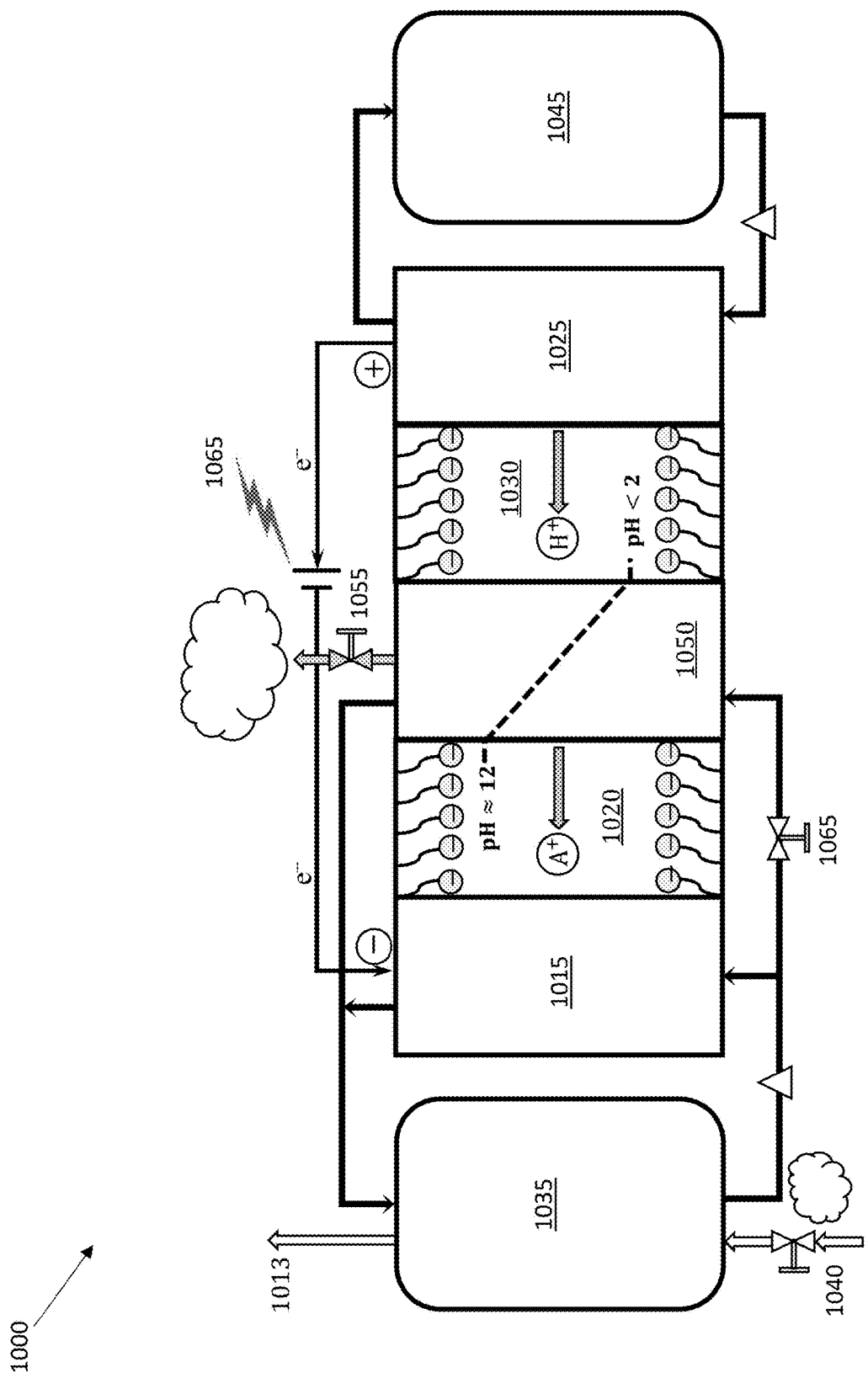
FIG. 10 is an example schematic of an embodiment of a CC-RFB cell.

The various reaction steps for generic redox couples during the charge mode that occur in the different layers of the cell as shown in FIG. 10 are also listed below:

| Component | | Reaction |
|---|---|---|
| Contactor, | $s_{C,1}$: | $OH^- + CO_2 \rightleftarrows HCO_3^-$ |
| | $s_{C,2}$: | $OH^- + HCO_3^- \rightleftarrows CO_3^{2-} + H_2O$ |
| Negative, | $s_{-,1}$: | $O_- + AOH + e^- \rightleftarrows R_- + OH^-$ |
| | $s_{-,2}$: | $OH^- + A^+ \rightleftarrows AOH$ |
| Neg OR: | | $O_- + A^+ + e^- \rightleftarrows R_-$ |
| NL, | $S_{NL,1}$: | $H^+ + CO_3^{2-} \rightleftarrows HCO_3^-$ |
| | $S_{NL,2}$: | $H^+ + HCO_3^- \rightleftarrows H_2O + CO_2$ |
| | $S_{NL,3}$: | $H^+ + AOH \rightleftarrows A^+ + H_2O$ |
| Positive, | $s_{+,1}$: | $R_+ \rightleftarrows O_+ + H^+ + e^-$ |
| Cell OR: | | $O_- + AOH + R_+ \rightleftarrows R_- + H_2O + O_+$ |
| $CO_2$ Capture: | | $CO_{2,f} \rightleftarrows CO_{2,p}$ |

During the discharge cycle of the storage cycle for the cell shown in system 1000, since $CO_2$ capture is not involved, the reactions that occur are

| Component | | Reaction |
|---|---|---|
| Negative, | $s_{-,1}$: | $R_- + OH^- \rightleftarrows O_- + AOH + e^-$ |
| | $s_{-,2}$: | $AOH \rightleftarrows OH^- + A^+$ |
| Neg OR: | | $R_- \rightleftarrows O_- + A^+ + e^-$ |
| NL, | $S_{NL,3}$: | $A^+ + H_2O \rightleftarrows H^+ + AOH$ |
| Positive, | $s_{+,1}$: | |
| | | $O_+ + H^+ + e^- \rightleftarrows R_+$ |
| Cell OR: | | $R_- + H_2O + O_+ \rightleftarrows O_- + AOH + R_+$ |

As a more concrete example, if the same redox couples at the two electrodes were used as those discussed in a previous example, then during the charge process

| Component | | Reaction |
|---|---|---|
| Neg, | $s_{-,1}$: | $Na_2^+Zn(OH)_4^{2-} + 2e- \rightleftarrows Zn + 2NaOH + 2OH^-$ |
| | $s_{-,2}$: | $2OH^- + 2Na^+ \rightleftarrows 2NaOH$ |
| Neg OR: | | $Na_2^+Zn(OH)_4^{2-} + 2Na^+ + 2e^- \rightleftarrows Zn + 4NaOH; \Phi_{-,0}^\circ = -1.21$ V |
| NL, | $S_{NL,1}$: | $H^+ + CO_3^{2-} \rightleftarrows HCO_3^-$ |
| | $S_{NL,2}$: | $H^+ + HCO_3^- \rightleftarrows H_2O + CO_2$ |
| | $S_{NL,3}$: | $2H^+ + 2NaOH \rightleftarrows 2Na^+ + 2H_2O$ |
| Pos, | $s_{+,1}$: | $2H_2^+[Fe^{2+}Cl_4^-] \rightleftarrows 2H^+[Fe^{3+}Cl_4^-] + 2H^+ + 2e^-; \Phi_{+,0}^\circ = +0.77$ V |
| OR: | | $Na_2^+Zn(OH)_4^{2-} + 2H_2^+[Fe^{2+}Cl_4^-] \rightleftarrows Zn + 2H^+[Fe^{3+}Cl_4^-] + 2NaOH + 2H_2O$ |
| $CO_2$ Capture: | | $CO_{2,f} \rightleftarrows CO_{2,p}$ | while the electrode reactions during discharge mode are

| Component | | Reaction |
|---|---|---|
| Neg, | $s_{-, 1}$: | $Zn + 2NaOH + 2OH^- \rightleftharpoons Na_2^+Zn(OH)_4^{2-} + 2e^-$ |
| | $s_{-, 2}$: | $2NaOH \rightleftharpoons 2OH^- + 2Na^+$ |
| Neg OR: | | $Zn + 4NaOH \rightleftharpoons Na_2^+Zn(OH)_4^{2-} + 2Na^+ + 2e^-; \Phi_{-, 0}^o = -1.21$ V |
| NL: | $S_{NL, 3}$: | $2Na^+ + 2H_2O \rightleftharpoons 2H^+ + 2NaOH$ |
| Pos, | $s_{+, 1}$: | $2H^+ [Fe^{3+}Cl_4^-] + 2H^+ + 2e^- \rightleftharpoons 2H_2^+[Fe^{2+}Cl_4^-]; \Phi_{+, 0}^o = +0.77$ V |
| OR: | | $Zn + 2H^+[Fe^{3+}Cl_4^-] + 2NaOH + 2H_2O \rightleftharpoons Na_2^+Zn(OH)_4^{2-} + 2H_2^+[Fe^{2+}Cl_4^-];$ |
| | | $V_0^o = 1.99$ V |

The resulting cell Nernst potential, $V_0^o = (\Phi_{+, 0}^o)_{pH=0} - (\Phi_{-, 0}^o)_{pH=14} = +0.77 - (-1.22) = 1.99$ V, and hence, this is a good system, although the negative Zn electrode tends to suffer from hydrogen evolution owing to its low standard electrode potential, as evident from FIG. 6.

As another example of redox couples for the ⊖-CEM1-NL-CEM2-⊕ cell configuration shown in FIG. 10, if the conventional redox couples of the vanadium redox flow battery (VRFB) for both the negative and the positive electrodes are used, e.g., the negative electrode with the $V^{3+/2+}$ cation and NaOH as the supporting electrolyte, while for the positive electrode the $V^{5+}/V^{4+}$ redox couple is used in an acidic electrolyte, e.g., with HCl.

Figure 11:
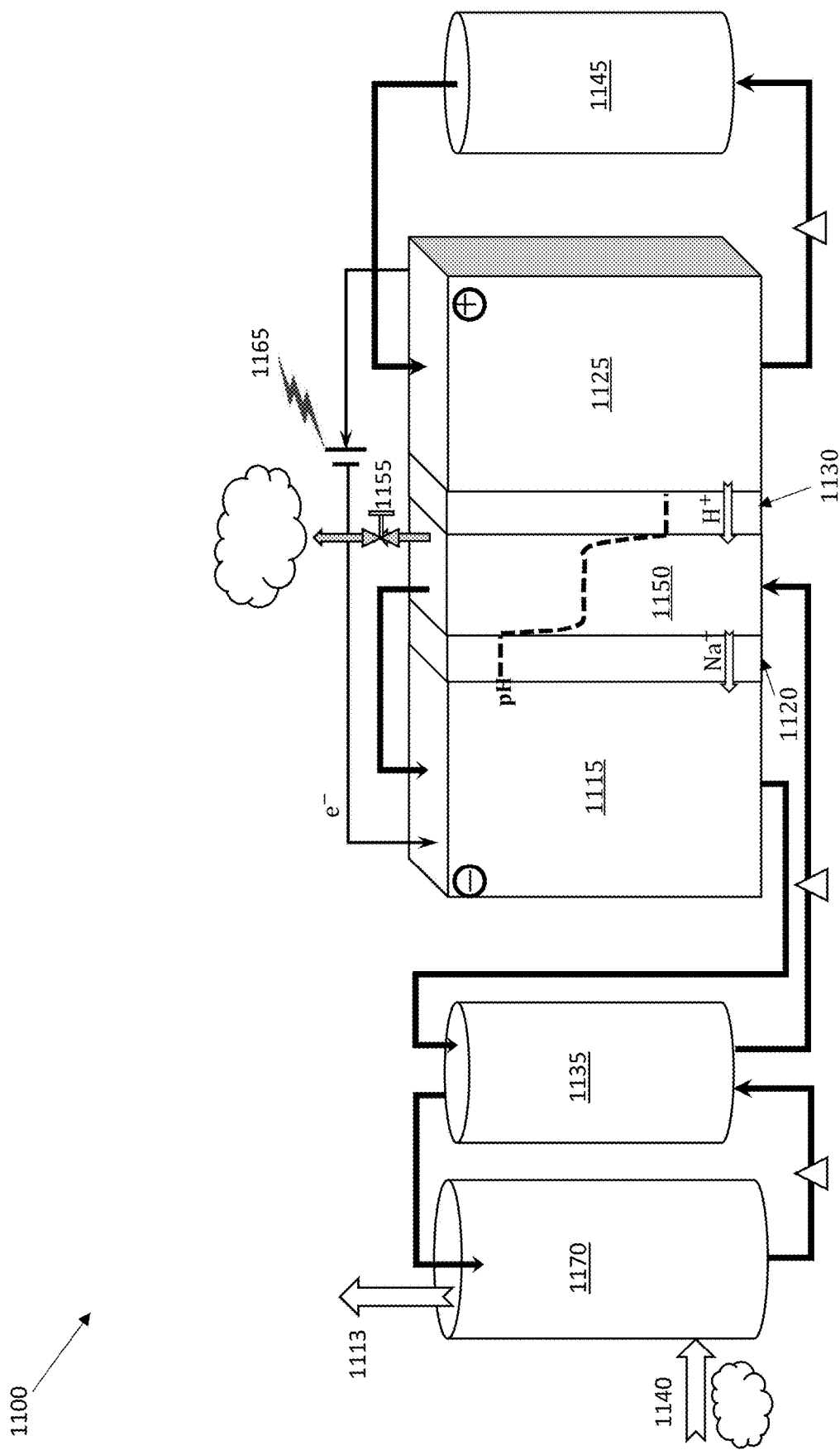
FIG. 11 is an example schematic of an embodiment of a CC-RFB cell for combined electrochemical carbon capture and energy storage based on a vanadium redox flow battery (VRFB), shown in CC/charge mode.

FIG. 11 shows such an embodiment, where the system 1100 is similar to that of 1000 of FIG. 10. A negolyte tank 1135 is fed with $CO_2$ but includes a $CO_2$ absorber 1170 that receives air from a $CO_2$ source 1140 and is separate from the cell and its storage tanks 1135, 1145. The input gas can be a $CO_2$ source such as flue gas or ambient air. Cleansed exhaust leaves the absorber 1170 (and/or the negolyte tank 1035) via outlet 1013. Acidic posolyte is contained in posolyte tank 1145. Pure $CO_2$ exits the NL 1150 along exhaust 1155. Load 1165 is electrically connected to the unit.

The exemplary reactions in the different components of the system 1100 during the charge mode are charging is simply reused to drive the carbon capture. However, it would usually be more profitable to use some of the stored energy for accommodating grid demand variability at the different time-scales.

Figure 12:
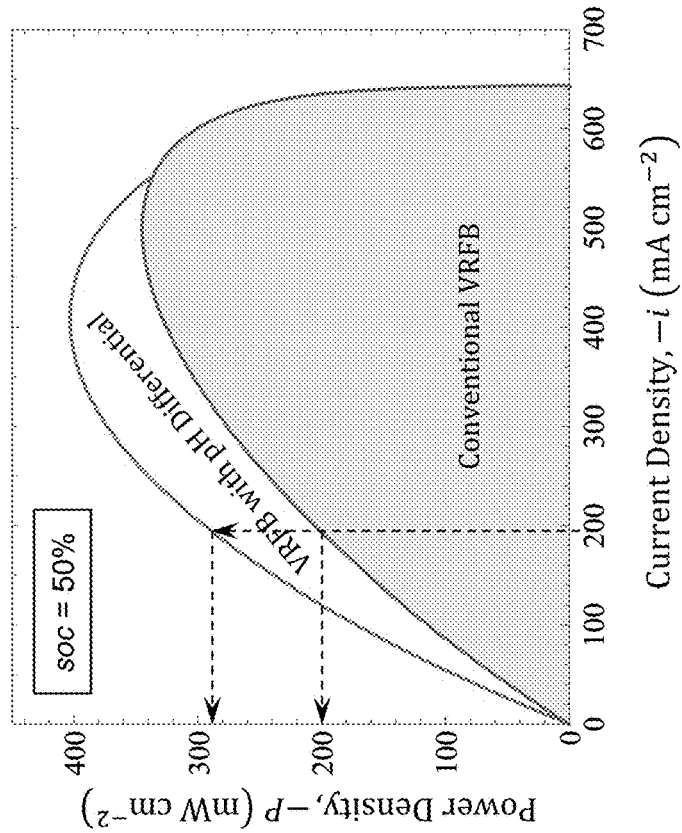
FIG. 12 is a polarization plot for discharge mode for a cell with and without a pH differential for a state of charge=50%.
Figure 13:
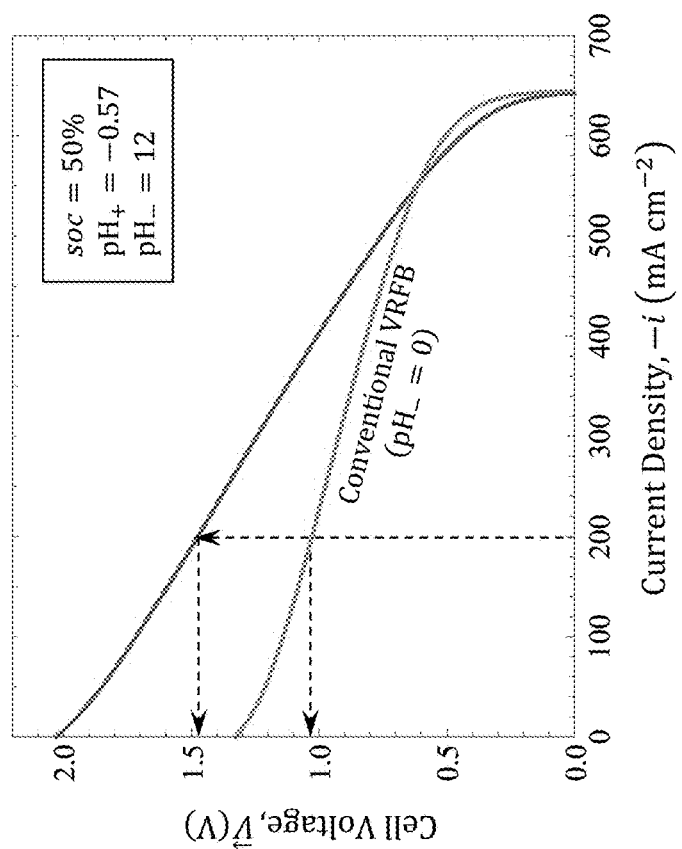
FIG. 13 is a plot showing a comparison of discharge power density in a conventional VRFB versus that in a VRFB with a pH differential.

FIGS. 12 and 13 provide a comparison of the discharge polarization curve and power density, respectively, for a conventional VRFB (without a pH differential) and for a VRFB with a pH differential, from the standpoint of energy storage.

For example, for an operating current density of 200 mA $cm^{-2}$, the cell voltage is roughly 1.48 V in comparison to 1.08 V in the conventional VRFB (FIG. 12). The resulting 400 mV improvement is significant, and results in a higher power density during the discharge phase as shown in FIG. 13. The higher slope of the CC-RFB curve is because of the additional resistance of the NL and an additional CEM in the proposed cell in composition to the conventional VRFB cell.

There is corresponding rise in the voltage during charging mode as well. For instance, for a common current density of $|i|=200$ mA $cm^{-2}$ during charge and discharge phases, the discharge potential $\vec{V}=1.48$ V, while the charge potential for this current density is $\overleftarrow{V}=2.78$ V.

| Component | Reaction |
|---|---|
| Absorber: | $NaOH + CO_{2, f} \rightleftharpoons NaHCO_3$ |
| -ve: | $V^{3+}(OH^-)_3 + Na^+ + e^- \rightleftharpoons V^{2+}(OH^-)_2 + NaOH; \Phi_{-, 0}^o \approx -1.09$ V |
| NL: | $H^+ + NaHCO_3 \rightleftharpoons Na^+ + H_2O + CO_{2, p}$ |
| +ve: | $VO^{2+}(Cl^-)_2 + H_2O \rightleftharpoons VO_2^+(Cl^-) + HCl + H^+ + e^-; \Phi_{+, 0}^o = +1.004$ V |
| Cell: | $V^{3+}(OH^-)_3 + VO^{2+}(Cl^-)_2 \rightleftharpoons V^{2+}(OH^-)_2 + VO_2^+(Cl^-) + HCl; V_0^o \approx 2.094$ V |
| Carbon Capture: | $CO_{2, f} \rightleftharpoons CO_{2, p}$ |

During the discharge mode, the absorber, electrode, and the cell overall reactions are

| Component | Reaction |
|---|---|
| -ve: | $V^{2+}(OH^-)_2 + NaOH \rightleftharpoons V^{3+}(OH^-)_3 + Na^+ + e^-; (\Phi_{-, 0}^o)_{pH-14} \approx -1.09$ V |
| NL: | $Na^+ + H_2O \rightleftharpoons H^+ + NaOH$ |
| +ve: | $VO_2^+(Cl^-) + HCl + H^+ + e^- \rightleftharpoons VO^{2+}(Cl^-)_2 + H_2O; (\Phi_{+, 0}^o)_{pH-0} = +1.004$ V |
| Cell: | $V^{2+}(OH^-)_2 + VO_2^+(Cl^-) + HCl \rightleftharpoons V^{3+}(OH^-)_3 + VO^{2+}(Cl^-)_2; V_0^o \approx 2.094$ V |

NaOH and $Na_2CO_3$ (aq) travel from the negolyte tank 1135 to the absorber 1170

When all the processes in one complete cycle ($CO_2$ absorption, cell charge, and cell discharge) are combined, the only net effect is carbon capture, $CO_{2, f} \rightleftharpoons CO_{2, p}$ besides electricity exchange. Thus, the overall system simply acts as a carbon capture device, if all of the energy stored during The resulting energy storage cycle efficiency for uniform current density over the cycle $$\ddot{\varepsilon}_{ES} \approx \frac{\vec{V}}{\overleftarrow{V}} = \frac{1.48}{2.78} = 53\%$$

which compares with a corresponding efficiency of 63% for the conventional VRFB without a pH differential. Similarly, the cell efficiency for energy storage at 150 mA cm$^{-2}$ drops from 69% for conventional VRFB to 60% for the VRFB with a pH differential. In short, the pH differential results in a higher energy density and a smaller stack for a given duty, but at the expense of a reduction in cycle efficiency because of the potential drops in the additional layers needed to sustain the pH differential.

The above estimates include the work of carbon capture as well. If this were excluded, i.e., for the case of a pH differential RFB without CC, the efficiencies are somewhat higher. On the other hand, if the work expenditure attributable to carbon capture is that due to thermodynamic work of carbon capture, $V_{0,CC}$, plus twice the Ohmic losses in the additional layers to sustain the pH, i.e., CEM1 and NL, then the energy efficiency of CC may be estimated via the expression the expression provided above.

Figure 14:
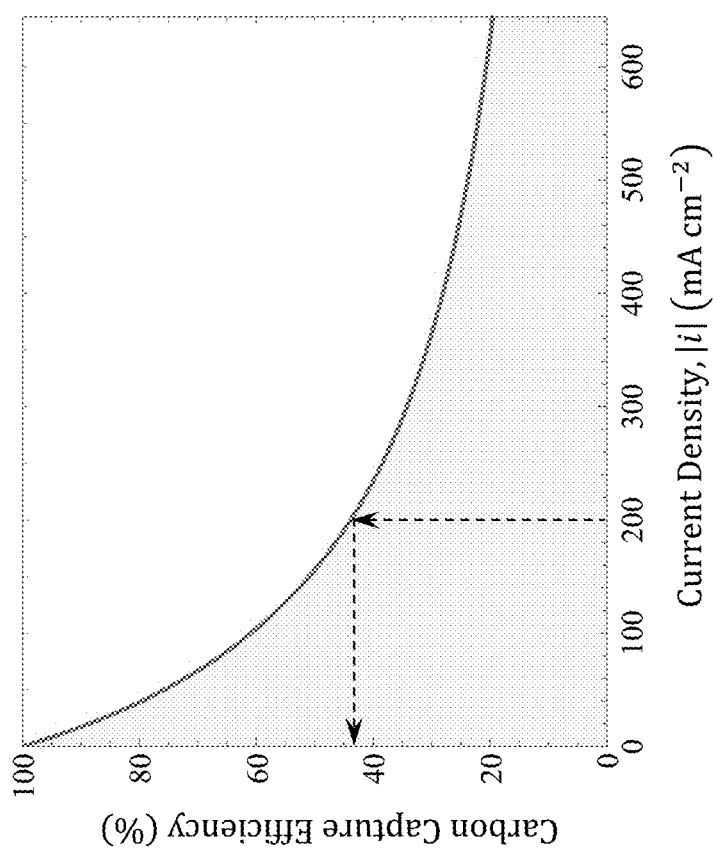
FIG. 14 is a plot of the efficiency of a cell configured for direct air capture as a function of current density.

This is plotted in FIG. 14 as a function of the operating current density assuming $n_{CC}=1$, and shows that impressive direct air capture efficiencies can be obtained, e.g., an efficiency of 44% at a current density of 200 mA cm$^{-2}$. To this must be added the work of absorption in the absorption column. Nonetheless, the resulting efficiencies will be significantly better than, e.g., the 5% efficiency, for instance, in the Carbon Engineering process.

As another example of the ⊖-CEM1-NL-CEM2-⊕ cell configuration (e.g., as discussed with respect to FIG. 10), the $VO^{2+}/VO_2^+$ redox couple for the acidic positive electrode is used as above, but for the negative electrode the $[Fe(TEA)OH]^{2-}/[Fe(TEA)OH]^-$ redox couple is used, where TEA denotes the triethanolamine ligand, in the alkaline negolyte such as NaOH solution. Then the reactions during the discharge mode are

| Component | Reaction |
|---|---|
| −ve: | $Na_2^+[Fe(TEA)OH]^{2-} \rightleftharpoons Na^+[Fe(TEA)OH]^- + Na^+ + e^-$; $(\Phi_{-,0}^o)_{pH=14} = -1.05$ V |
| NL: | $Na^+ + H_2O \rightleftharpoons H^+ + NaOH$ |
| +ve: | $VO_2^+(Cl^-) + HCl + H^+ + e^- \rightleftharpoons VO^{2+}(Cl^-)_2 + H_2O$; $(\Phi_{+,0}^o)_{pH=0} = +1.004$ V |
| Cell: | $Na_2^+[Fe(TEA)OH]^{2-} + VO_2^+(Cl^-) + HCl \rightleftharpoons Na^+[Fe(TEA)OH]^- + VO^{2+}(Cl^-)_2 + NaOH$; $V_0^o \approx 2.054$ V |

Thus, the cell Nernst voltage at a soc=0.5, and for direct air capture, $$\overline{V}_0 = 2.064 + \left(\frac{8.314 \times 298}{2 \times 96,485}\right)\ln\left(\frac{0.5}{0.5}\right)^2 + \left(\frac{8.314 \times 298}{1.47 \times 96,485}\right)\ln\left(\frac{1}{0.00041}\right) =$$

$$2.054 + 0 + 0.136 = 2.19 \text{ V}$$

during charge, while during discharge, $\overline{V}_o=2.054$ V. This is another good system for combined energy storage and carbon capture, since TEA complexes are routinely used for carbon capture.

If on the other hand, the $Fe^{3+}/Fe^{2+}$ redox couple was used for the posolyte instead of the $VO^{2+}/VO_2^+$ redox couple, then the reactions during the discharge mode of the all iron CC-RFB system are

| Component | Reaction |
|---|---|
| −ve: | $Na_2^+[Fe(TEA)OH]^{2-} \rightleftharpoons Na^+[Fe(TEA)OH]^- + Na^+ + e^-$; $(\Phi_{-,0}^o)_{pH=14} = -1.05$ V |
| NL: | $Na^+ + H_2O \rightleftharpoons H^+ + NaOH$ |
| +ve: | $Fe^{3+}(Cl_3^-) + H^+ + e^- \rightleftharpoons Fe^{2+}(Cl_2^-) + HCl$; $(\Phi_{+,0}^o)_{pH=0} = +0.77$ V |
| Cell: | $Na_2^+[Fe(TEA)OH]^{2-} + Fe^{3+}(Cl_3^-) + H_2O \rightleftharpoons Na^+[Fe(TEA)OH]^- + Fe^{2+}(Cl_2^-) + HCl + NaOH$; $V_0^o \approx 1.82$ V |

In summary, twin CEMs, one for the proton, $H^+$, and the other for the alkali cation, $A^+$, appears to be especially advantageous for the goal of combined carbon capture with energy storage. This is so as the CEMs are better developed commercially and have longer lives, especially those based on fluoropolymers, since the $OH^-$ ions are very reactive and destroy the AEMs. Further, the ionic conductivities in CEMs are better and also anionic redox species can be largely excluded from them reducing crossover.

However, in principle one could also devise the ⊖-AEM1-NL-AEM2-⊕ arrangement which might also be advantageous once improved AEMs are available.

4) An Arrangement with Same Redox Molecule at Both Electrodes for Carbon Capture: When the goal is only carbon capture, an attractive alternative may be to use the same redox couple in both the negolyte with an alkaline supporting electrolytes such as KOH, as well as in the posolyte with an acidic supporting electrolyte, e.g., HCl, provided the chosen molecule is soluble in and compatible with both electrolytes.

An example of such a redox couple is the ferro-/ferricyanate couple which is stable under both alkaline and acidic conditions. In such a case, $V_0^o=0$. Then, e.g., the electrode reactions for the ⊖-CEM1-NL-CEM2-⊕ scheme (FIG. 10, but with $R_-=R_+$ and $O_-=O_+$) are:

| Component | Reaction |
|---|---|
| Neg: | $A_3^+[Fe^{III}(CN)_6]^{3-} + AOH + e^- \rightleftharpoons A_4^+[Fe^{II}(CN)_6]^{4-} + OH^-$ |
| | $OH^- + A^+ \rightleftharpoons AOH$ |
| Neg OR: | $A_3^+[Fe^{III}(CN)_6]^{3-} + A^+ + e^- \rightleftharpoons A_4^+[Fe^{II}(CN)_6]^{4-}$; |
| | $(\Phi_{-,0}^o)_{pH=0} = +0.358$ V |
| Pos: | $H_4^+[Fe^{II}(CN)_6]^{4-} \rightleftharpoons H_3^+[Fe^{III}(CN)_6]^{3-} + H^+ + e^-$; |
| | $(\Phi_{-,0}^o)_{pH=0} = +0.358$ V | while the reactions in other layers remain the same. Alternately, this could be implemented in a scheme with an ⊖-CEM-NL-AEM-⊕ configuration.

For the systems shown in which the reaction at both electrodes is the same, $(V_0^o)_{pH=0} \to 0$, and the Nernst potential for the electrode reactions is based primarily on the pH differential and the soc, i.e., $$\overline{V}_0 = \frac{RT}{nF}\ln\left(\frac{soc}{1-soc}\right)^2 + \left(\frac{RT}{n_{CC}F}\right)\ln\left(\frac{p_{CO_2,p}}{p_{CO_2,f}}\right) + 2.3026\left(\frac{RT}{F}\right)(pH_- - pH_+)$$

for the charge mode. Thus, the cell voltage can be minimized and the CC efficiency can be maximized.

5) Arrangement Using Only a Single Liquid Redox Electrolyte: The necessity of the usage of a finite amount of negolyte and posolyte means that the state-of-charge changes with time, affecting the efficacy of the process gradually and also limiting in a cyclic process the phase for carbon capture, before the electrolytes solutions are replenished or renewed, e.g., by following the reverse of the carbon capture/charging process, i.e., via discharging the solutions. If inexhaustible materials such as air or water could be utilized at one or both electrodes, then the carbon capture process could be carried out in a given cell in a more uninterrupted manner.

Figure 15:
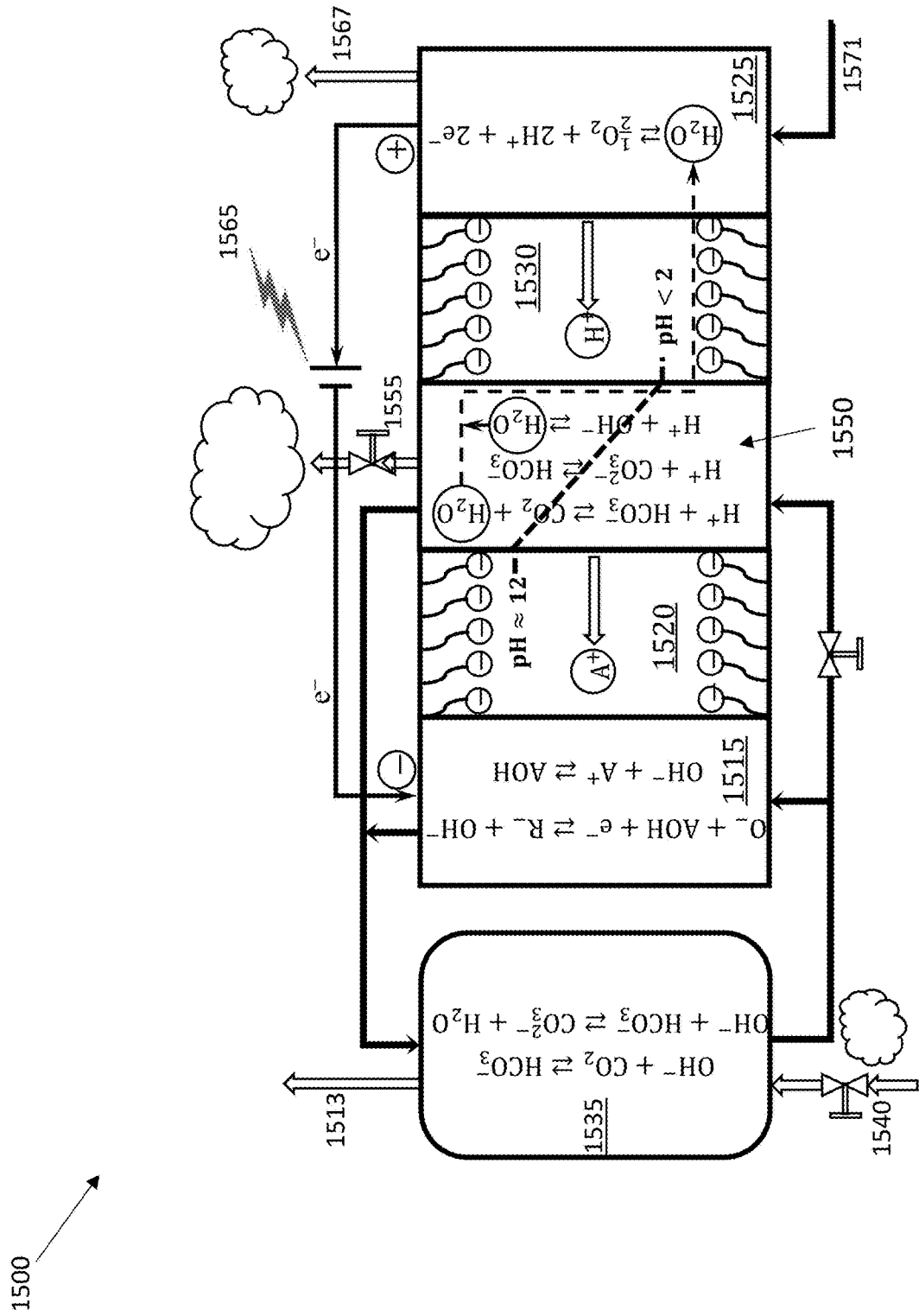
FIG. 15 is a schematic of an embodiment of a CC-RFB cell with two CEMs and using oxygen electrode reaction at the positive electrode.

FIG. 15 shows a system 1500 using a ⊖-CEM1-NL-CEM2-⊕ configuration where CEM1 1520 and CEM2 1530 sandwich NL 1550. Here, the active molecule in the posolyte has been replaced by the $H_2O/O_2$ redox couple, which may be supplied from outside, or recycled within as indicated in the FIG. 15, while the negolyte in tank 1535 is assumed to be a conventional redox molecule, e.g., quinone. An advantage of this scheme is that it produces pure oxygen that exits via outlet 1567 in addition to producing a pure $CO_2$ stream that exits at 1555. The resulting oxygen could be used for therapeutic or industrial purposes, including for oxy-combustion of fuels to produce pure $CO_2$, as in the Carbon Engineering process. The soc of the conventional negolyte redox molecule must still be restored, either chemically, or electrochemically, as for instance during the discharge phase in a cell.

As a specific example, let us select the oxygen electrode reaction (OER) at the positive electrode and β-anthraquinone sulfonic acid ($H_2aQ$) as the redox molecule in the negolyte. Then, during the carbon capture/charge cycle, it is seen in FIG. 15 that the processes at the negative electrode, contactor, and the NL remain then unchanged as discussed above in connection with FIG. 10. The only change is in the reaction at the positive electrode, where water that is input at 1571 reacts to evolve pure oxygen, i.e., $$\text{Positive}: H_2O \rightleftharpoons \frac{1}{2}O_2 + 2H^+ + 2e^-; \Phi_{+,0}^o = +1.229 \text{ V}$$

The positive electrode in this case would be identical to that in a PEM electrolyzer, e.g., comprising of a titanium foam gas-diffusion layer (Ti-GDL) along with an $IrO_2$, or a Ru—$IrO_2$, catalyst layer, interspersed with Nafion gel, and followed by a CEM, e.g., Nafion® 1135, or Nafion® 115.

During the discharge cycle, on the other hand, since there is no $CO_2$, the reactions are:

| Electrode | Reaction |
|---|---|
| Anode, $s_{-,1}$: | $A_2aQ + 2OH^- \rightleftharpoons aQ^{2-} + 2AOH + 2e^-$; $(\Phi_{-,0}^o)_{pH=0} = +0.187$ V |
| $s_{-,2}$: | $2AOH \rightleftharpoons 2OH^- + 2A^+$ |
| NL, $s_{NL,3}$: | $2A^+ + 2H_2O \rightleftharpoons 2H^+ + 2AOH$ |
| Cathode, $s_{+,1}$: | $½O_2 + 2H^+ + 2e^- \rightleftharpoons H_2O$; $(\Phi_{+,0}^o)_{pH=0} = +1.229$ V |
| Cell OR: | $A_2aQ + H_2O + 1/2O_2 \rightleftharpoons aQ^{2-} + 2AOH$; $(V_0^o)_{pH=0} = 1.042$ V |

The advantage of using the oxygen electrode reaction at the positive electrode is that air can be fed during the discharge phase, and no storage or recharging of the posolyte is needed. This is somewhat similar to a PEM water electrolyzer/fuel cell used cyclically for energy storage. However, since hydrogen electrode reaction (HER) is not used at the negative electrode in the above arrangement, it avoids storage of hydrogen and use of any precious metal catalyst needed for it. A disadvantage is that the overpotentials of OER are much higher than for a typical redox molecule, and precious metal catalyst is needed at the positive electrode. The resulting increased cost and lower efficiency is compensated by the generation of pure oxygen.

For the scheme in FIG. 15, during the charge phase, the Nernst potential $$\overline{V}_0 = (V_0^o)_{pH=0} + \left(\frac{8.314 \times 298}{1.47 \times 96,485}\right)\ln\left(\frac{1}{0.00041}\right) + 2.3026\left(\frac{8.314 \times 298}{96,485}\right)(12-0) = 1.042 + 0.136 + 0.71 = 1.888 \text{ V}$$

while in the discharge phase, in the absence of $CO_2$, the Nernst potential $$\overline{V}_0 = V_0^o + 2.3026\left(\frac{8.314 \times 298}{96,485}\right)(12 - 2 \times 0) = 1.752 \text{ V}$$

In other words, the flow battery voltage for energy storage is significantly higher than generally possible in a battery based on an aqueous electrolyte-based system. Additionally, pure oxygen is produced, which is a valuable product. In reality, the estimate $V_{\Delta pH}=2.3026(RT/F)(pH_- - 2\ pH_+)$ used above is an overprediction for redox negolyte molecule with more than one exchangeable proton or cation, as is the case for the anthraquinone example used here, since at low pH or when the concentration of protons is high, only the exchange of second proton is affected.

Nonetheless, this system is potentially attractive for combined energy storage and carbon capture because of the higher cell voltage and power density. Further, it should be evident that the system can be implemented with alternate membrane structures, e.g., an ⊖-AEM-NL-CEM-⊕ configuration.

6) Embodiments without Redox Molecules for Continuous Carbon Capture: In another embodiment with the goal of continuous carbon capture without the use of any special redox active species even in the negolyte, but still including the supporting electrolyte, e.g., NaOH, or an absorbent in an aqueous solution to capture the $CO_2$, the system 1600 could take the form shown in FIG. 16 with an ⊖-AEM-NL-CEM-⊕ configuration. In this the same abundantly available redox couple, i.e., $H_2O/O_2$, is used at both electrodes, just operating in the reverse direction and at different pH.

Carbonated negolyte travels from the tank 1635 to the negative electrode and decarbonated negolyte from the electrode 1615 to the tank 1635. Water is input at 1671. Oxygen exits at 1667. Oxygen also transported to the negative electrode 1615.

Figure 16:
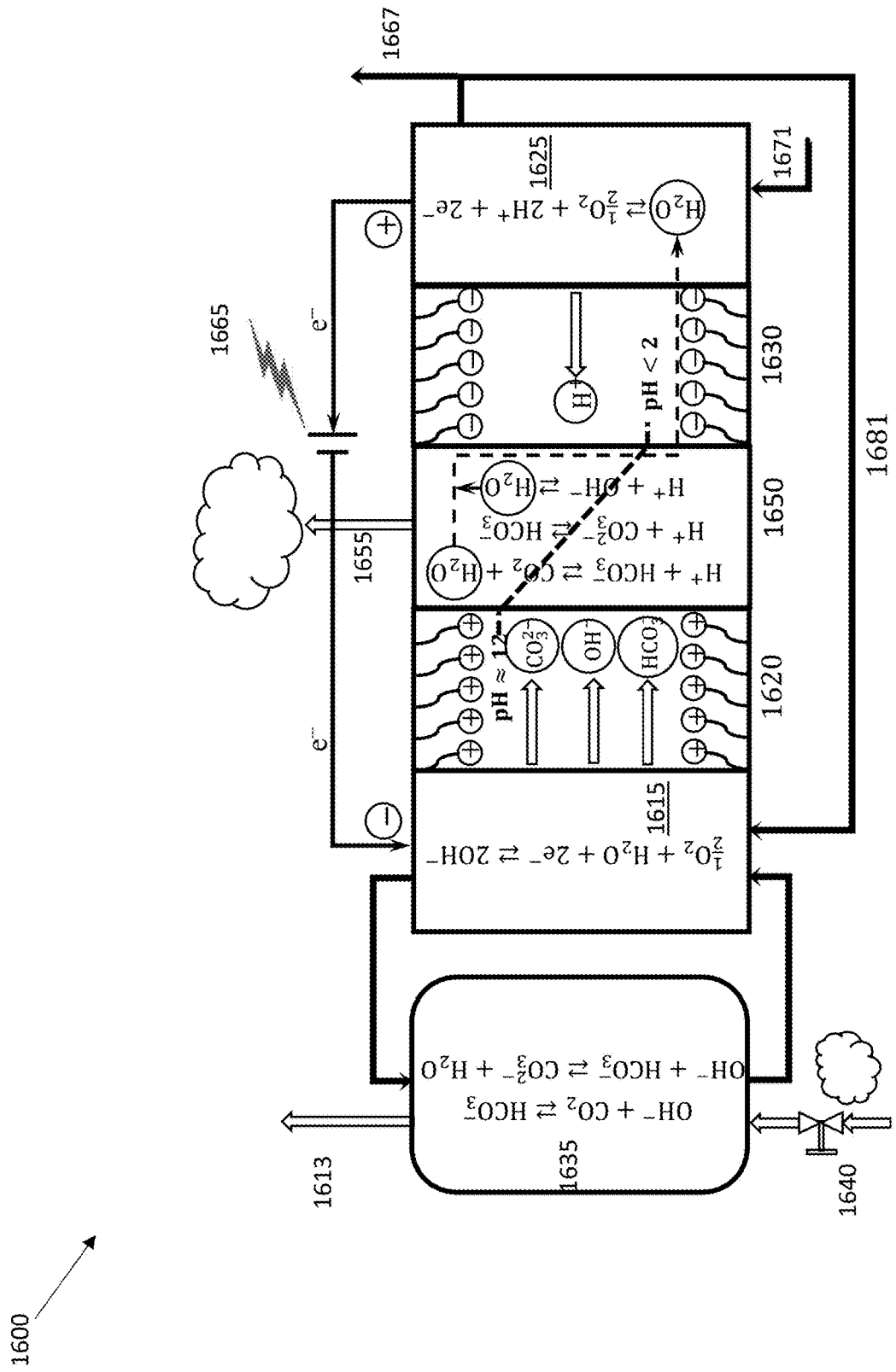
FIG. 16 is a schematic of an embodiment of a CC-RFB cell for continuous carbon capture using $O_2$ from air and water.

It is further conceivable that it may not be necessary to recycle oxygen from the positive to the negative electrode as shown in FIG. 16, as the sparged supporting electrolyte solution may have enough dissolved oxygen, especially for the case of direct air capture, to sustain a desired current. In fact, the direct air capture of $CO_2$ could conceivably be accomplished in situ within the negative electrode chamber.

The various reaction steps that occur in the carbon capture mode then are:

| Component | | Reaction | |
|---|---|---|---|
| Contractor, | $s_{C,1}$: | $OH^- + CO_2 \rightleftharpoons HCO_3^-$ | |
| | $s_{C,2}$: | $OH^- + HCO_3^- \rightleftharpoons CO_3^{2-} + H_2O$ | |
| Cathode, | $s_{-,1}$: | $\frac{1}{2}O_2 + H_2O + 2e^- \rightleftharpoons 2OH^-$; | $(\Phi_{-,0}^o)_{pH=14} = +0.401$ V |
| NL, | $s_{NL,1}$: | $H^+ + CO_3^{2-} \rightleftharpoons HCO_3^-$ | |
| | $s_{NL,2}$: | $H^+ + HCO_3^- \rightleftharpoons H_2O + CO_2$ | |
| | $s_{NL,3}$: | $H^+ + OH^- \rightleftharpoons H_2O$ | |
| Anode, $s_{+,1}$: | $s_{+,1}$: | $H_2O \rightleftharpoons \frac{1}{2}O_2 + 2H^+ + 2e^-$; | $(\Phi_{+,0}^o)_{pH=0} = +1.229$ V |
| $CO_2$ Capture: | | $CO_{2,f} \rightleftharpoons CO_{2,p}$ | |

The system 1600 shown in FIG. 16, the positive electrode is as described in connection with FIG. 15, while the negative electrode is similar to that for an electrolyzer based on an AEM, e.g., Fumasep® FAA membrane, Selemion® membrane, PiperION® membrane, or a Sustainion® membrane adjacent to an appropriate (e.g., Ag or Ni) catalyst and a graphite GDL electrode.

The potential of the negative electrode cited above already includes the effect of pH, so that the standard cell voltage $$V_0^o = (\Phi_{+,0}^o)_{pH=0} - (\Phi_{-,0}^o)_{pH=14} = 1.229 - 0.401 = +0.828 \text{ V}$$

which is simply that due to the pH differential, i.e., $$V_0^o = 2.3026\left(\frac{RT}{F}\right)(pH_- - pH_+) = 2.3026\left(\frac{8.314 \times 298}{96,485}\right)(14 - 0) = +0.828 \text{ V}$$

In other words, if the same redox couple could be used at both electrodes, i.e., under both acidic and alkaline conditions, then the cell voltage is minimized and the carbon capture efficiency is increased.

The ideal CC efficiency for this cell design for the case of direct air capture, assuming $n_{CC}=1.47$ as above $$\epsilon_{eCC} = \frac{V_{0,CC}}{V_{0,CC} + V_0^o} = \frac{0.1362}{0.1362 + 0.828} = 14.1\%$$

However, the actual efficiency would be lower, between 5%-10%, when the electrode overpotentials are included in the cell voltage. Even so, these efficiencies are comparable to those of the Carbon Engineering process.

Figure 17:
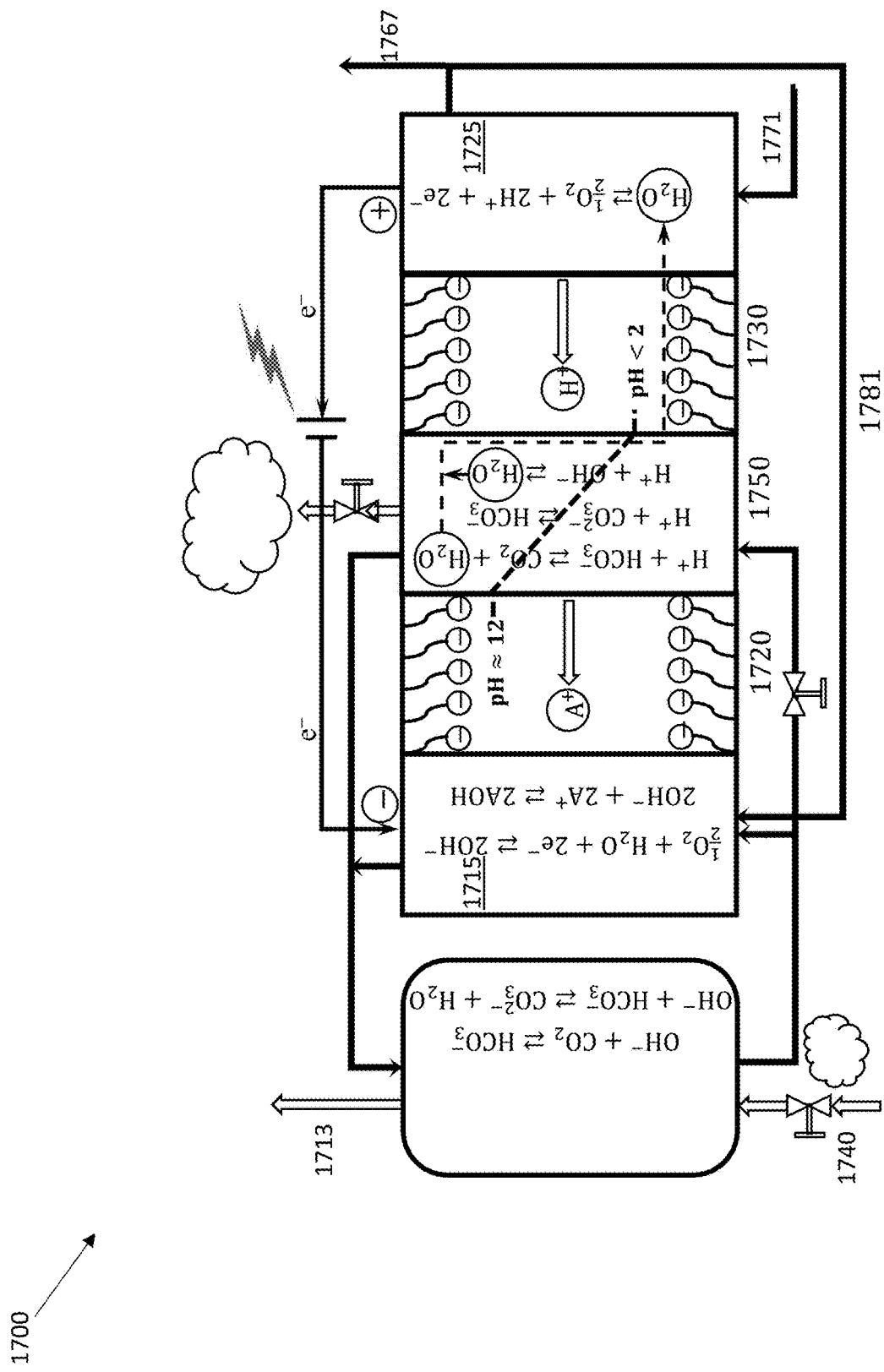
FIG. 17 is a schematic of another embodiment of a CC-RFB cell for continuous carbon capture using $O_2$ from air and water.

FIG. 17, on the other hand, is a system 1700 similar to the above scheme but in a configuration with two CEMs. The electrodes would be similar in structure to those described for FIGS. 15 and 16. In other words, because of the need for expensive/precious metal catalysts in these cells, their simplicity in design is offset by the higher cost. On the other hand, there is no energy storage. However, carbon capture is continuous and not simply in the charge mode, so that roughly only half the cells are needed for carbon capture.

Figure 18:
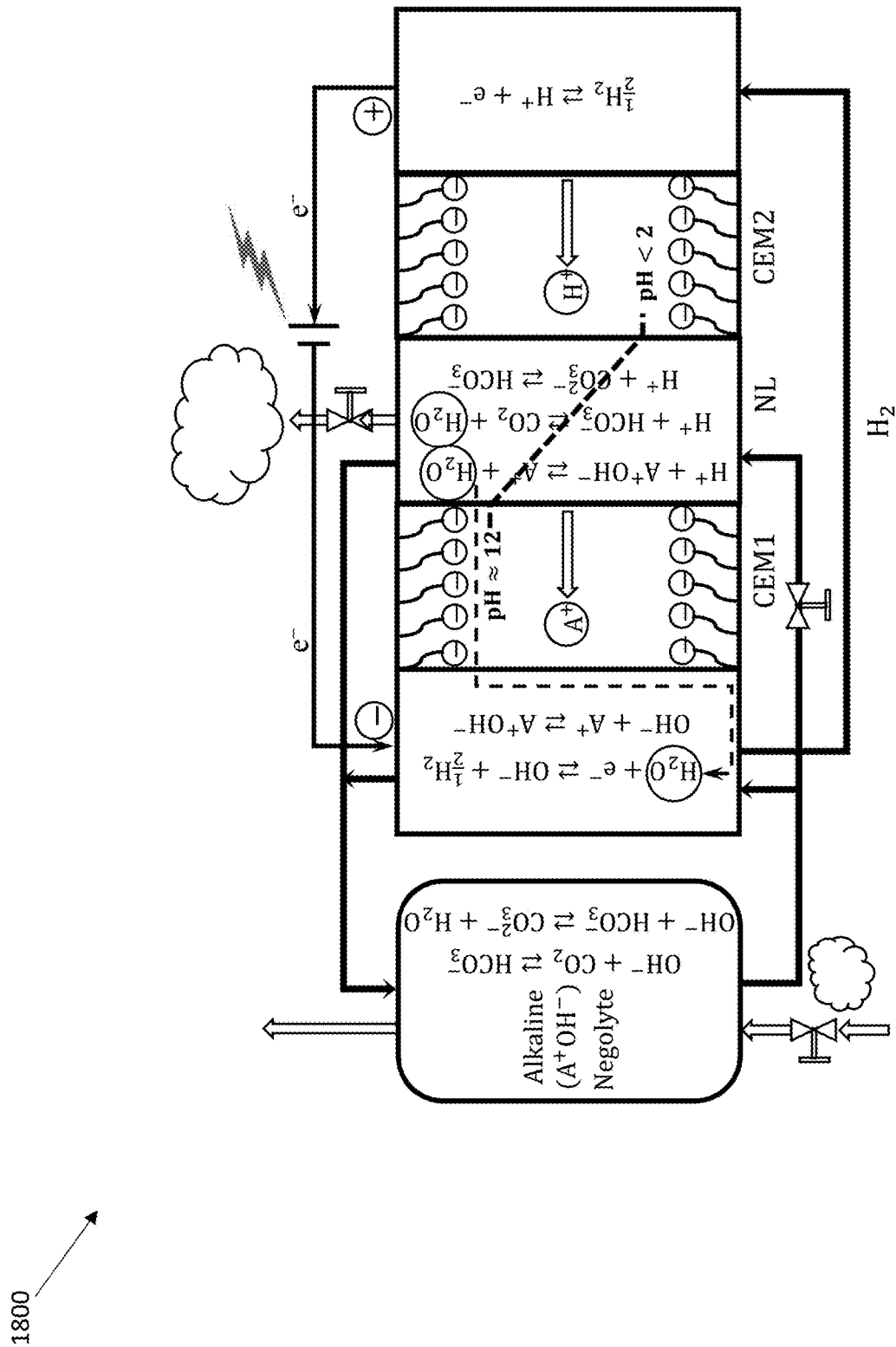
FIG. 18 of an embodiment of a CC-RFB cell for continuous carbon capture with no redox species except $H_2$.

Another system 1800 with 2 CEMs is shown in FIG. 18 that uses the hydrogen electrode reaction (HER) rather than OER, with the reductant $H_2$ being circulated rather than the oxidant $O_2$ being circulated. The advantage of this system is the significantly lower overpotentials of these electrodes on comparison to those with OER, as well as lower precious metal catalyst loadings. This scheme can also alternately be based on an AEM-CEM configuration.

7) Embodiment as a Carbon-Capturing Regenerative Redox Fuel Cell: An example of a carbon-capturing regenerative redox fuel cell (CC-RFC) in which, unlike a rechargeable flow battery, the cell is regenerated not via electric power, but rather chemically by a fuel, e.g., $H_2$ or methanol, and an oxidant, e.g., $O_2$ (from air), as shown schematically in FIG. 19 for the case of $H_2$ and $O_2$ as the reductant and the oxidant in a CC-RFC cell with the CEM1-NL-CEM2 configuration.

Figure 19:
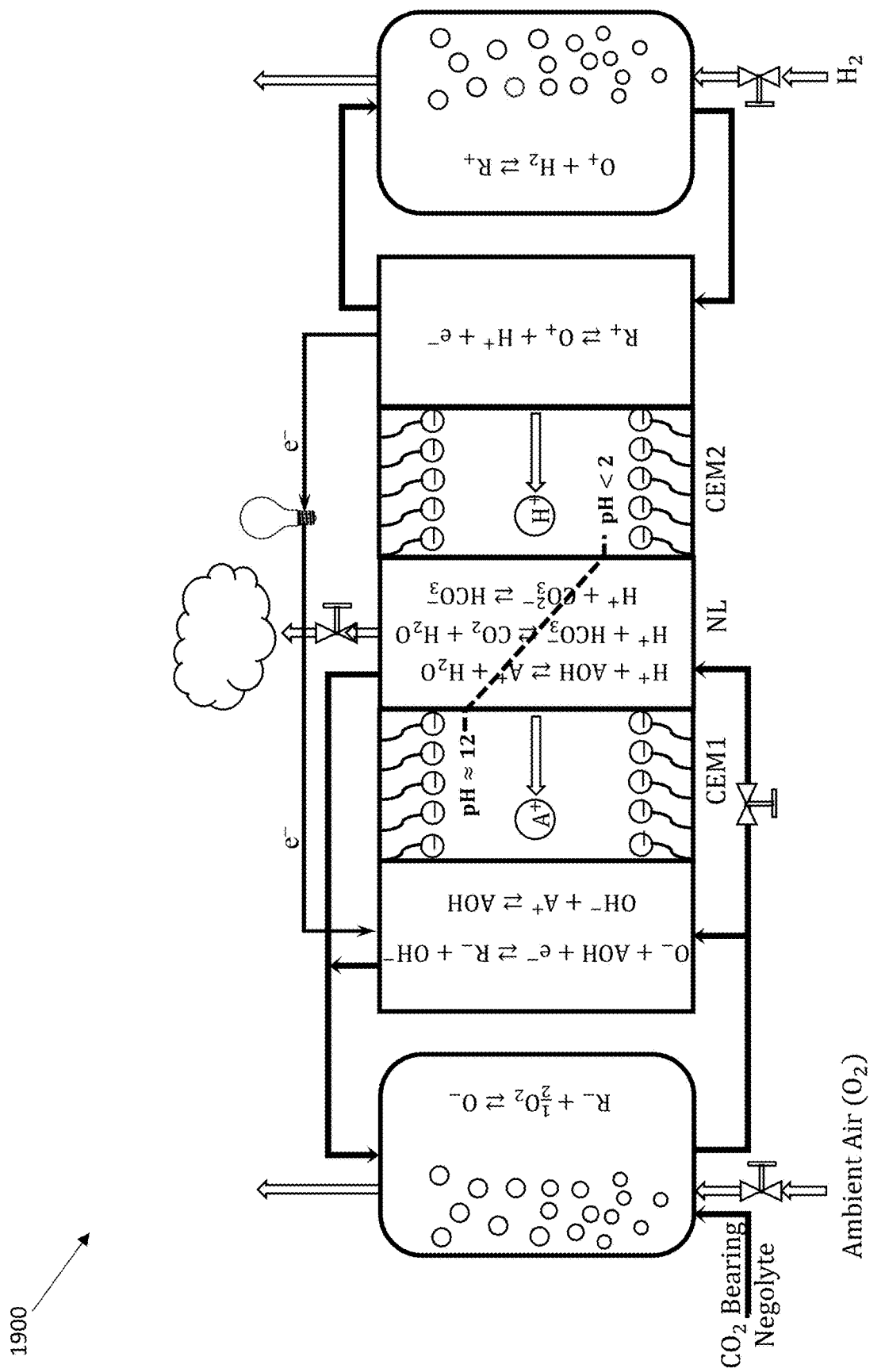
FIG. 19 of an embodiment of a CC-RFB cell powered by a fuel and an oxidant and producing power while capturing carbon.

In the system 1900 shown in FIG. 19, the redox couples work as redox catalysts for the $H_2$ oxidation (HOR) and for the oxygen reduction reaction (ORR). The CC-RFCs are different from CC-RFBs as they, like fuel cells, can be operated continuously so long as a supply of the fuel and the oxidant are available, since the soc does not change with time.

As an example, the $VO^{2+}/VO_2^+$ redox couple can be used for the acidic electrolyte and the $[Fe(TEA)OH]^{2-}/[Fe(TEA)OH]^-$ redox couple for the basic electrolyte. The redox couples must be chosen with potentials that allow them to be reduced by $H_2$ and oxidized by $O_2$.

For the chosen redox couples, the reactions in the absorber and in the cell, as before, are

| Component | Reaction |
|---|---|
| Absorber: | $NaOH + CO_{2,f} \rightleftharpoons NaHCO_3$ |
| -ve: | $Na^+[Fe(TEA)OH]^- + Na^+ + e^- \rightleftharpoons Na_2^+ [Fe(TEA)OH]^{2-}$; $(\Phi_{-,0}^o)_{pH=14} = -1.05$ V |
| NL: | $H^+ + NaHCO_3 \rightleftharpoons Na^+ + H_2O + CO_{2,p}$ |
| +ve: | $VO^{2+} (Cl^-)_2 + H_2O \rightleftharpoons VO_2^+(Cl^-) + HCl + H^+ + e^-$; $(\Phi_{+,0}^o)_{pH=0} = +1.004$ V |
| Cell: | $Na^+[Fe(TEA)OH]^- + VO^{2+} (Cl^-)_2 \rightleftharpoons Na_2^+ [Fe(TEA)OH]^{2-} + VO_2^+(Cl^-) + HCl$; $V_0^o = 2.054$ V |
| Carbon Capture: | $CO_{2,f} \rightleftharpoons CO_{2,p}$ |

In addition, the chemical regeneration reactions assuming $H_2$ and $O_2$ as the reductant and the oxidant in the reactors are

| Component | Reaction |
|---|---|
| Negolyte Regen: | $Na_2^+[Fe(TEA)OH]^{2-} + \frac{1}{2}\left(H_2O + \frac{1}{2}O_2\right) \rightleftharpoons Na^+[Fe(TEA)OH]^- + NaOH$ |
| Posolyte Regen: | $VO_2^+(Cl^-) + HCl + \frac{1}{2}H_2 \rightleftharpoons VO^{2+}(Cl^-)_2 + H_2O$ |

When the above reactions in the absorber, the cell and in the chemical regeneration reactors are combined, there result simply the fuel cell overall reaction along with carbon capture, $$\text{Redox Fuel Cell}: \frac{1}{2}\left(H_2 + \frac{1}{2}O_2\right) \rightleftharpoons \frac{1}{2}H_2O$$

$$\text{Carbon Capture}: CO_{2,f} \rightleftharpoons CO_{2,p}$$

Catalysts may well be needed for the chemical regeneration steps.

Further, it is possible that partial regeneration of the negolyte redox couple may occur in the $CO_2$ absorber itself because of the presence of $O_2$. For instance, if the anthraquinone sulfonic acid ($H_2aQ$) is used as the redox molecule in the negolyte, it is sensitive to oxygen. However, that is not an issue here, since oxidation is the goal for its regeneration here. The oxygen sensitivity of the reduced form of a redox couple may, in fact be exploited for its facile oxidation.

What is claimed is:

1. A flow electrochemical cell comprising:
   a negative electrode configured to be in fluid communication with alkaline negative electrolyte for producing CO2-bearing anions;
   a positive electrode configured to be in fluid communication with acidic positive electrolyte, the alkaline negative electrolyte and the acidic positive electrolyte further comprising redox active molecules that participate in redox reactions to store electrical energy;
   a first ion-exchange membrane in contact with the negative electrode;
   a second ion-exchange membrane in contact with the positive electrode; and
   an intermediate neutralyte layer between the first ion-exchange membrane and the second ion-exchange membrane, the CO2-bearing anions transported to the neutralyte layer, via ion migration through the first ion-exchange membrane, or by pump transport of the alkaline negative electrolyte, to react with protons and thereby release the CO2 as a gas;
   wherein the first ion-exchange membrane and the second ion-exchange membrane are configured to maintain a pH differential between the negative electrode and the positive electrode.

2. The flow electrochemical cell of claim 1, wherein the pH differential enhances a difference in potential between the positive electrode and the negative electrode.

3. The flow electrochemical cell of claim 1, wherein the neutralyte layer is an inert polymer or ceramic material.

4. The flow electrochemical cell of claim 3, wherein the neutralyte layer through which a neutral electrolyte flows is porous.

5. The flow electrochemical cell of claim 1, wherein the first ion-exchange membrane is one of a cation-exchange membrane (CEM) and an anion-exchange membrane (AEM).

6. The flow electrochemical cell of claim 5, wherein if the first ion-exchange membrane is AEM then the second ion-exchange membrane is CEM and if the first ion-exchange membrane is CEM then the second ion-exchange membrane is AEM.

7. The flow electrochemical cell of claim 5, wherein the second ion-exchange membrane is an AEM if the first ion-exchange membrane is an AEM, and the second ion-exchange membrane is a CEM if the first ion-exchange membrane is a CEM.

8. The flow electrochemical cell of claim 1, wherein the alkaline negative electrolyte captures $CO_2$ from an input mixture of gases to produce the $CO_2$-bearing anions in the alkaline negative electrolyte.

9. A system comprising:
   a source of alkaline negative electrolyte configured to produce CO2-bearing anions;
   a source of acidic positive electrolyte, the alkaline negative electrolyte and the acidic positive electrolyte further comprising redox active molecules that participate in redox reactions to store electrical energy; and
   a plurality of flow electrochemical cells in fluid communication with the sources of electrolyte, the flow electrochemical cells comprising:
   a negative electrode,
   a positive electrode,
   two ion-exchange membranes in contact with the negative electrode and the positive electrode, respectively, and
   an intermediate neutralyte layer between the two ion-exchange membranes, the CO2-bearing anions transported to the neutralyte layer, via ion migration through the first ion-exchange membrane, or by pump transport of the alkaline negative electrolyte, to react with protons and thereby release the CO2 as a gas,
   wherein the flow electrochemical cells are configured for simultaneous $CO_2$ capture and electrical energy storage.

10. The system of claim 9, wherein the plurality of flow electrochemical cells are configured to be connected to an electrical grid.

11. The system of claim 9, wherein the plurality of flow electrochemical cells are configured to be connected to an electrical energy generating system.

12. The system of claim 11, wherein the electrical energy generating system is a natural gas combined cycle power plant or renewable generator.

13. The system of claim 9, comprising a $CO_2$ gas absorber is in fluid communication with the alkaline negative electrolyte or neutralyte.

14. The system of claim 9, wherein the plurality of flow electrochemical cells are grouped in at least a first stack and a second stack.

15. The system of claim 14, where the first stack is in electrical and fluid communication with the second stack.

16. The system of claim 9, wherein the ion-exchange membranes are cation-exchange membranes.

17. The flow electrochemical cell of claim 1, further comprising:
   an intermediate electrolyte comprising $CO_2$-bearing anions, wherein the $CO_2$-bearing anions are distinct from to the negative electrolyte.

18. The flow electrochemical cell of claim 1, further comprising:
   an intermediate electrolyte comprising $CO_2$-bearing anions, wherein the $CO_2$-bearing anions are similar to the negative electrolyte.

* * * * *